(12) United States Patent
Chen et al.

(10) Patent No.: US 11,905,605 B2
(45) Date of Patent: Feb. 20, 2024

(54) GRAPHENE OXIDE MATERIAL, HALOGENATED GRAPHENE MATERIAL, PREPARATION METHODS THEREFOR, AND ELECTROLYSIS SYSTEM

(71) Applicant: XIAMEN UNIVERSITY, Fujian (CN)

(72) Inventors: Duhong Chen, Fujian (CN); Dongping Zhan, Fujian (CN); Binbin Zhang, Fujian (CN); Zhongqun Tian, Fujian (CN)

(73) Assignee: XIAMEN UNIVERSITY, Fujian (CN)

( * ) Notice: Subject to any disclaimer, the term of this patent is extended or adjusted under 35 U.S.C. 154(b) by 0 days.

(21) Appl. No.: 17/756,240

(22) PCT Filed: May 13, 2020

(86) PCT No.: PCT/CN2020/090056
§ 371 (c)(1),
(2) Date: May 19, 2022

(87) PCT Pub. No.: WO2021/098165
PCT Pub. Date: May 27, 2021

(65) Prior Publication Data
US 2023/0002916 A1 Jan. 5, 2023

(30) Foreign Application Priority Data
Nov. 20, 2019 (CN) .......................... 201911139799.1
Nov. 20, 2019 (CN) .......................... 201911140082.9

(51) Int. Cl.
*C25B 1/135* (2021.01)
*C01B 32/194* (2017.01)
*C01B 32/198* (2017.01)

(52) U.S. Cl.
CPC ............ *C25B 1/135* (2021.01); *C01B 32/194* (2017.08); *C01B 32/198* (2017.08)

(58) Field of Classification Search
CPC ..... C25B 1/135; C01B 32/194; C01B 32/198; C01P 2002/72
See application file for complete search history.

(56) References Cited

U.S. PATENT DOCUMENTS 10,199,637 B2   2/2019   Zhamu et al.
10,415,144 B2   9/2019   Abdelkader et al.
(Continued)

FOREIGN PATENT DOCUMENTS

CN    105084355 A    11/2015
CN    105899457 A    8/2016
(Continued)

OTHER PUBLICATIONS

Yang, Dong, et al. "Work-function-tunable chlorinated graphene oxide as an anode interface layer in high-efficiency polymer solar cells." Advanced Energy Materials 4.15 (2014): 1400591.*
(Continued)

*Primary Examiner* — Richard M Rump
(74) *Attorney, Agent, or Firm* — MEDLER FERRO WOODHOUSE & MILLS PLLC

(57) ABSTRACT

The present invention relates to a graphene oxide material, a halogenated graphene material, preparation methods therefor, and an electrolysis system. A method for producing a graphene oxide material in an electrolysis system comprises the following steps: applying a voltage between a working electrode and a counter electrode, and exfoliating graphite and/or amorphous carbon under the action of electrolysis so as to generate the graphene oxide material, wherein before applying the voltage and/or in the process of applying the voltage, light irradiation is performed on the electrolysis system.

16 Claims, 11 Drawing Sheets

(56) References Cited

U.S. PATENT DOCUMENTS

| | | | |
|---|---|---|---|
| 10,508,037 B2 | | 12/2019 | Pei et al. |
| 2016/0298244 A1 | * | 10/2016 | Abdelkader .............. C25B 1/00 |
| 2018/0090769 A1 | * | 3/2018 | Jo .......................... H10K 50/15 |
| 2019/0194417 A1 | | 6/2019 | Wei et al. |

FOREIGN PATENT DOCUMENTS

| | | | | |
|---|---|---|---|---|
| CN | 106744883 A | | 5/2017 | |
| CN | 107215867 A | | 9/2017 | |
| CN | 108074752 A | * | 5/2018 | |
| CN | 108483432 A | | 9/2018 | |
| CN | 109311053 A | | 2/2019 | |
| CN | 109433013 A | | 3/2019 | |
| CN | 109704314 A | | 5/2019 | |
| CN | 109928388 A | | 6/2019 | |
| CN | 110075710 A | | 8/2019 | |
| CN | 110339733 A | | 10/2019 | |
| CN | 111235587 A | | 6/2020 | |
| CN | 111252759 A | | 6/2020 | |
| WO | WO-2016156797 A1 | * | 10/2016 | ........... C01B 32/194 |
| WO | WO-2018107212 A1 | * | 6/2018 | ........... C01B 32/198 |

OTHER PUBLICATIONS

English machine translation of CN109928388 (2019).*
Munuera, J. M., et al. "Electrochemical exfoliation of graphite in aqueous sodium halide electrolytes toward low oxygen content graphene for energy and environmental applications." ACS applied materials & interfaces 9.28 (2017): 24085-24099.*
International Search Report dated Jul. 24, 2020 in corresponding International Patent Application No. PCT/CN2020/090056.

* cited by examiner

GRAPHENE OXIDE MATERIAL, HALOGENATED GRAPHENE MATERIAL, PREPARATION METHODS THEREFOR, AND ELECTROLYSIS SYSTEM

TECHNICAL FIELD

The present invention relates to the field of materials, in particular to a graphene oxide material, a halogenated graphene material as well as preparation method therefor and electrolysis system.

BACKGROUND ART

Graphene oxide refers to a two-dimensional carbon material with oxygen-containing functional groups attached to the surface and/or boundary of graphene.

The related art adopts the Hummers method to prepare graphene oxide, which is obtained by reacting graphite powder with a mixed solution of concentrated sulfuric acid, potassium permanganate and sodium nitrate for several days.

The related art also adopts an electrochemical method to prepare graphene oxide. This method utilizes the conductive properties of graphite, and by using graphite as a working electrode, under the action of current, the molecules and/or ions in the electrolyte solution perform the intercalation and/or oxidation of graphite, then the graphite layer is exfoliated from the graphite, so as to finally obtain graphene oxide.

In the related art, an electrochemical system for exfoliating graphite may comprise a graphite working electrode, a counter electrode, an electrolyte solution, a power source, and so on. The working electrode can be made of highly oriented pyrolytic graphite, graphite rod, graphite foil or graphite sheet. The counter electrode can be made of platinum wire, platinum sheet, graphite rod, graphite sheet, and so on. The electrolyte solution for electrochemically preparing graphene oxide can be an ionic liquid, organic electrolyte solution or inorganic electrolyte solution. The working electrode can be used as an anode or a cathode in the electrolysis system.

CONTENTS OF THE PRESENT INVENTION

The inventors have unexpectedly found that when using an electrochemical method to prepare graphene oxide, by applying light illumination to the electrolysis system before and/or during applying a voltage thereto, in comparison with the condition without light illumination, a graphene oxide with higher degree of oxidation can be obtained.

In some aspects, there is provided a method for preparing a graphene oxide material in an electrolysis system, wherein, the electrolysis system comprises:
a working electrode, in which the working electrode comprises graphite and/or amorphous carbon;
a counter electrode, in which the counter electrode is an electrical conductor; and
an electrolyte solution, in which the electrolyte solution is a conductive solution comprising a carboxyl group;
wherein, the method comprises the following steps:
applying a voltage between the working electrode and the counter electrode, so that the graphite and/or amorphous carbon is exfoliated under the action of electrolysis to generate a graphene oxide material;
wherein, before and/or during applying the voltage, a light illumination is applied to the electrolysis system.

In some aspects, there is provided a method for preparing a halogenated graphene material in an electrolysis system, wherein, the electrolysis system comprises:
a working electrode, in which the working electrode comprises graphite and/or amorphous carbon;
a counter electrode, in which the counter electrode is an electrical conductor; and
an electrolyte solution, in which the electrolyte solution is a conductive solution comprising a halide ion and/or a halogen-containing complex ion;
wherein, the method comprises the following steps:
applying a voltage between the working electrode and the counter electrode, so that the graphite and/or amorphous carbon is exfoliated under the action of electrolysis to generate a halogenated graphene;
wherein, before and/or during applying the voltage, a light illumination is applied to the electrolysis system.

In some embodiments, the halogenated graphene refers to a graphene modified with a halide ion and/or a halogen-containing complex ion.

In some embodiments, the halide ion is one or more selected from the group consisting of fluoride ion, chloride ion, bromide ion, and iodide ion. Preferably, the halide ion is chloride ion.

In some embodiments, the halogen-containing complex ion refers to a complex ion containing a halogen, and the halogen is selected from the group consisting of fluorine, chlorine, bromine, or iodine. Optionally, the halogen-containing complex ion is chloroaluminate ion, chloroplatinate ion or chloroaurate ion, for example, $AlCl_4^-$.

In some embodiments, the electrolyte solution comprising a halide ion may be an electrolyte solution comprising a halide-containing complex ion.

In some embodiments, the light illumination has an intensity as follows: the light illumination is capable of reducing the absorbance value at 650 nm of a chromogenic solution with a volume equal to that of the electrolyte solution by 10% or more (e.g., 15% or more, such as 20% or more) within 30 minutes, the chromogenic solution is an aqueous solution containing methylene blue and oxalic acid, the concentration of methylene blue is 10'M, and the concentration of oxalic acid is 0.1M.

In some embodiments, the chromogenic solution is freshly prepared.

In some embodiments, the light illumination has an intensity as follows: the light illumination is capable of reducing the absorbance value at 650 nm of a chromogenic solution with a volume equal to that of the electrolyte solution by 20% or more (e.g., 30% or more, such as 40% or more) within 1 hour, the chromogenic solution is an aqueous solution containing methylene blue and oxalic acid, the concentration of methylene blue is 10'M, and the concentration of oxalic acid is 0.1M.

In some embodiments, the light illumination uses a light comprising a light with a wavelength of a nm, a=10~2000, such as a=10~400, such as a=10~100, 100~200, 200~400, 400~600, 600~800, 800~1000, 1000~1200, 1200~1400, 1400~1600, 1600~1800 or 1800~2000.

In some embodiments, the light illumination uses a light with an optical power density of greater than or equal to 100 mW/cm², such as greater than or equal to 200 mW/cm², such as greater than or equal to 300 mW/cm², such as greater than or equal to 400 mW/cm², such as 100~500 mW/cm².

In some embodiments, the optical power density at the working electrode is greater than or equal to 100 mW/cm², such as greater than or equal to 200 mW/cm², such as greater than or equal to 300 mW/cm$^2$, such as greater than or equal to 400 mW/cm$^2$, such as 100-500 mW/cm$^2$.

In some embodiments, the light illumination applied to per liter of the electrolyte solution has a power of 10~100 W, such as 10~20 W, 20~30 W, 30~50 W, 50~70 W or 70~90 W.

In some embodiments, the light illumination is applied for more than 30 minutes, such as more than 1 hour, such as more than 3 hours, such as more than 5 hours.

In some embodiments, the light illumination is derived from a light source that is xenon lamp or ultraviolet lamp.

In some embodiments, the voltage has a value of 2~1000 V, such as 10~220 V, such as 2~5 V, 5~10 V, 10~15 V, 15~20 V, 20~25 V, 25~30 V.

In some embodiments, the voltage is applied for a time in total of more than 5 minutes, such as more than 30 minutes, such as more than 1 hour, such as more than 3 hours, such as more than 5 hours.

In some embodiments, the method for preparing a graphene oxide in an electrolysis system or preparing a halogenated graphene material in an electrolysis system comprises the following steps: first applying a square wave voltage of −0.5V to 10V between the working electrode and the counter electrode for 10~60 minutes, and then applying a constant voltage of 10~1000V for more than 5 minutes. The application of the square wave voltage of −0.5V to 10V is capable of promoting the activation and expansion of graphite and/or amorphous carbon.

In some embodiments, the light illumination is applied to the working electrode and/or the electrolyte solution before and/or during applying the voltage;

In some embodiments, the light illumination is applied to the working electrode and the electrolyte solution during applying the voltage. For example, a light from a light source is applied to the electrolyte solution, and passes through the electrolyte solution to illuminate the working electrode. The electrolyte solution is preferably transparent, for example, has a light transmittance of 50% or more, for example, 80% or more.

In some embodiments, the graphite is one or more selected from the group consisting of highly oriented pyrolytic graphite (HOPG), graphite foil, graphite rod, and graphite flake.

In some embodiments, the amorphous carbon is one or more selected from the group consisting of charcoal, coal, coke, carbon black.

In some embodiments, in the method for preparing a graphene oxide in an electrolysis system, the electrolyte solution comprises one or more of the following substances: carboxylic acid and carboxylate salt.

In some embodiments, the carboxylic acid is one or more selected from the group consisting of formic acid, oxalic acid, tricarballylic acid, and butanetetracarboxylic acid.

In some embodiments, the carboxylic acid is formic acid. In some embodiments, the carboxylic acid is oxalic acid. In some embodiments, the carboxylic acid is tricarballylic acid. In some embodiments, the carboxylic acid is butanetetracarboxylic acid.

In some embodiments, the carboxylate salt is one or more selected from the group consisting of formate salt, oxalate salt, tricarballylate salt, and succinate salt.

In some embodiments, the carboxylate salt is a formate salt. In some embodiments, the carboxylate salt is an oxalate salt. In some embodiments, the carboxylate salt is a tricarballylate salt. In some embodiments, the carboxylate salt is a succinate salt.

In some embodiments, in the method for preparing a graphene oxide in an electrolysis system, the electrolyte solution comprises one or more of the followings: oxalic acid and oxalate salt.

In some embodiments, in the method for preparing a graphene oxide in an electrolysis system, the carboxyl group in the electrolyte solution has a concentration of 0.001~10 mol/L, such as 0.001~0.1 mol/L, such as 0.1~1 mol/L, such as 1~10 mol/L.

In some embodiments, in the method for preparing a graphene oxide in an electrolysis system, the electrolyte solution has a pH of 0~12, for example, 1, 2, 3, 4, 5, 6, 7, 8, 9, 10, 11 or 12.

In some embodiments, in the method for preparing a graphene oxide in an electrolysis system, the electrolyte solution comprises $Na^+$.

In some embodiments, in the method for preparing a graphene oxide in an electrolysis system, the electrolyte solution comprises $SO_4^{2-}$.

In some embodiments, in the method for preparing a graphene oxide in an electrolysis system, the electrolyte solution comprises $Na_2SO_4$.

In some embodiments, in the method for preparing a graphene oxide in an electrolysis system, the $SO_4^{2-}$ in the electrolyte solution has a concentration of 0.001~10 mol/L, such as 0.001~0.1 mol/L, such as 0.1~1 mol/L, such as 1~10 mol/L.

In some embodiments, in the method for preparing a halogenated graphene in an electrolysis system, the electrolyte solution comprises NaX, wherein X represents F, Cl, Br, or I. Preferably, X represents Cl.

In some embodiments, in the method for preparing a halogenated graphene in an electrolysis system, the halide ion and/or a halogen-containing complex ion in the electrolyte solution has a concentration of 0.001~10 mol/L, such as 0.001~0.1 mol/L, such as 0.1~1 mol/L, such as 1~10 mol/L.

In some aspects, there is provided a graphene oxide material, which is prepared by the method according to any one of the embodiments of the present disclosure.

In some embodiments, the graphene oxide material comprises one or more species selected from the group consisting of: single-layer graphene oxide, double-layer graphene oxide, few-layer graphene oxide.

In some aspects, there is provided a graphene oxide material, and the material has an XPS spectrum with the following characteristics: the C1s peak of its XPS spectrum, when subjected to A peak-split process, the ratio of the peak corresponding to 287.8~288.3 ev to the peak Corresponding to 286.0~286.5 ev is 0.3~2:1, such as 0.3~0.5:1, 0.5~0.7:1, 0.7~0.9:1, 0.9~1.1:1, 1.1~1.3:1, 1.3~1.5:1, 1.5~1.7:1, 1.7~1.9:1 or 1.9~2:1.

In some embodiments, the peak corresponding to 287.8~288.3 ev represents carboxyl group.

In some embodiments, the peak corresponding to 286.0~286.5 eV represents the superposition of hydroxyl and ether groups.

In some embodiments, the graphene oxide material has an XPS spectrum with the following characteristics: the area ratio of the C1s peak to the O1s peak is 0.8~2.2:1, such as 0.8~1.0:1, 1.0~1.2:1, 1.2~1.4:1, 1.4~1.6:1, 1.6~1.8:1, 1.8~2.0:1 or 2.0~2.2:1.

In some embodiments, the graphene oxide material comprises one or more species selected from the group consisting of single-layer graphene oxide, double-layer graphene oxide, and few-layer graphene oxide.

In some embodiments, the graphene oxide material comprises single-layer graphene oxide in an amount of greater than or equal to 90%.

In some aspects, there is provided a graphene oxide membrane, comprising a plurality of layers of graphene oxide material in laminated form, in which aniline molecules are arranged between at least two adjacent layers of the graphene oxide material, and the graphene oxide material is the graphene oxide according to any one of embodiments of the present disclosure.

In some aspects, there is provided a method for preparing the above graphene oxide membrane, comprising the following steps:
- obtaining a dispersion solution of graphene oxide material, in which the graphene oxide material is the graphene oxide material according to any one of embodiments of the present disclosure;
- passing the dispersion of graphene oxide material through a filter membrane, and depositing a graphene oxide membrane on the filter membrane;
- soaking the graphene oxide membrane obtained in the previous step in a solution comprising aniline;
- optionally, subjecting the soaked graphene oxide membrane to one or more operations selected from the group consisting of washing and drying.

In some aspects, there is provided a halogenated graphene material, which is prepared by the method according to any one of the embodiments of the present disclosure.

In some aspects, there is provided an electrolysis system, comprising
- a light treatment device, the light treatment device comprises a light source, the light source is configured to illuminate an electrolyte solution in the electrolysis system; and
- an electrolysis device, in which the electrolysis device comprises an electrolysis vessel, and the electrolysis vessel is configured to contain electrolytic solution and provide a place where an electrolysis reaction occurs.

In some embodiments, the light source is configured to illuminate the electrolyte solution within the electrolysis vessel.

In some embodiments, the light treatment device further comprises a light treatment vessel, the light treatment vessel is configured to contain electrolyte solution and to provide electrolyte solution to the electrolysis vessel, the light source is configured to illuminate the electrolytic solution in the light treatment vessel, and the light treatment vessel is configured to be able to.

In some embodiments, the electrolysis vessel or the light treatment vessel is provided with a light-transmitting structure, and the light source is configured to illuminate the inside of the electrolysis vessel or inside of the light treatment vessel through the light-transmitting structure.

In some embodiments, the light-transmitting structure is an opening or a light-transmitting window.

In some embodiments, the light-transmitting structure has a light transmittance of higher than 10%, for example, a light transmittance of higher than 50%, for example, a light transmittance of higher than 90%.

In some embodiments, the light source is located within the electrolysis vessel or the light treatment vessel.

In some embodiments, the electrolysis device comprises a working electrode and a counter electrode, and the working electrode and the counter electrode are located within the electrolysis vessel.

In some embodiments, the light source is configured to illuminate the working electrode.

In some embodiments, the working electrode comprises graphite and/or amorphous carbon, and the counter electrode is an electrical conductor (e.g., a metal such as platinum).

In some embodiments, the electrolysis device further comprises a power source, and the power source is electrically connected to the working electrode and the counter electrode, respectively.

In some embodiments, the light source is able to emit a light with a wavelength of a nm, a=10~2000, such as a=10~400, such as a=10~100, 100~200, 200~400, 400~600, 600~800, 800~1000, 1000~1200, 1200~1400, 1400~1600, 1600~1800 or 1800~2000.

In some embodiments, the light source has an optical power density of greater than or equal to 100 mW/cm$^2$, such as greater than or equal to 200 mW/cm$^2$, such as greater than or equal to 300 mW/cm$^2$, such as greater than or equal to 400 mW/cm$^2$, such as 100~500 mW/cm$^2$.

In some embodiments, the light source is a xenon lamp or a UV lamp.

In some embodiments, the electrolysis system further comprises a circulation loop, the electrolysis vessel comprises a first liquid inlet and a first liquid outlet, and the circulation loop is communicated with the first liquid inlet and the first liquid outlet respectively.

In some embodiments, the circulation loop is provided outside the electrolysis vessel.

In some embodiments, the circulation loop is provided with a pump. The pump is used to drive the flow of liquid in the circulation loop. For example, the pump is used to drive the electrolyte solution to flow into the circulation loop through the first liquid outlet, and then flow into the electrolysis vessel from the circulation loop through the first liquid inlet.

In some embodiments, the circulation loop is provided with a valve, and the valve is used to open or close the circulation loop.

In some embodiments, the circulation loop is provided with a pump. The pump is used to drive the flow of liquid in the circulation loop. For example, the pump is used to drive the electrolyte solution to flow into the circulation loop through the first liquid outlet, and then flow into the electrolysis vessel from the circulation loop through the first liquid inlet.

In some embodiments, the circulation loop is provided with a valve, and the valve is used to open or close the circulation loop.

In some embodiments, the circulation loop is connected in series with a solid-liquid separating device.

In some embodiments, the solid-liquid separating device comprises a second liquid inlet, a second liquid outlet and a filter screen;
- the second liquid inlet and the second liquid outlet are respectively communicated with the circulation loop, and
- the filter screen is located between the second liquid inlet and the second liquid outlet.

In some embodiments, the solid-liquid separating device further comprises a liquid storage chamber, the liquid storage chamber is located below the filter screen, and the second liquid outlet communicates with the liquid storage chamber.

In some embodiments, the electrolysis system is an electrolysis system for preparing a graphene oxide or a halogenated graphene.

In some embodiments, under the action of an electric field, ion pairs in the electrolyte solution intercalate the graphitic layers of graphite and/or amorphous carbon, while reactive oxygen-containing radicals (e.g., OH) and a gas promote the oxidation and exfoliation of graphitic layers respectively and finally obtain the graphene oxide material.

In some embodiments, under the action of an electric field, ions in the electrolyte solution intercalate the graphitic layers of graphite and/or amorphous carbon, while active halogen-containing radicals (e.g., F, Cl, Br, I) and a gas promote the halogenation and exfoliation of the graphite layers respectively and finally obtain the halogenated graphene material.

In some aspects, there is provided an electrolysis system, comprising
- an electrolysis device, in which the electrolysis device comprises an electrolysis vessel, the electrolysis vessel is configured to contain an electrolyte solution and to provide a place where an electrolysis reaction occurs;
- a circulation loop, in which the electrolysis vessel comprises a first liquid inlet and a first liquid outlet, and the circulation loop is communicated with the first liquid inlet and the first liquid outlet respectively;
- a solid-liquid separating device, in which the solid-liquid separating device is connected in series on the circulation loop.

In some embodiments, the solid-liquid separating device comprises a second liquid inlet, a second liquid outlet and a filter screen;

The second liquid inlet and the second liquid outlet are respectively communicated with the circulation loop, The filter screen is located between the second liquid inlet and the second liquid outlet.

In some embodiments, the solid-liquid separating device further comprises a liquid storage chamber, the liquid storage chamber is located below the filter screen, and the liquid outlet communicates with the liquid storage chamber.

In some embodiments, the electrolysis system further comprises a light treatment device, the light treatment device comprises a light source, the light source is configured to illuminate an electrolyte solution within the electrolysis system.

In some embodiments, the light source is configured to illuminate an electrolyte solution within the electrolysis vessel.

In some embodiments, the light treatment device further comprises a light treatment vessel, in which the light treatment vessel is configured to contain electrolyte solution and provide the electrolyte solution to the electrolysis vessel, and the light source is configured to illuminate the electrolyte solution within the light treatment vessel.

In some embodiments, the light source is able to emit a light with a wavelength of a nm, wherein a=10~2000, for example a=10~400.

In some embodiments, the light source has an optical power density of greater than or equal to 100 mW/cm$^2$.

In some embodiments, the light source is a xenon lamp or a UV lamp.

In some embodiments, the light-transmitting structure is an opening or a light-transmitting window.

In some embodiments, the electrolysis device comprises a working electrode and a counter electrode, and the working electrode and the counter electrode are located within the electrolysis vessel.

In some embodiments, the electrolysis system is an electrolysis system for preparing a graphene oxide or halogenated graphene.

In some embodiments, the electrolysis system of the present disclosure is used to implement the method of the present disclosure for preparing a graphene oxide material in an electrolysis system.

In some aspects, there is provided a method for preparing a graphene oxide material in an electrolysis system, wherein, the electrolysis system comprises:
- a working electrode, in which the working electrode comprises graphite and/or amorphous carbon;
- a counter electrode, in which the counter is an electrical conductor; and
- an electrolyte solution, in which the electrolyte solution is a conductive solution comprising a carboxyl group;

wherein, the method comprises the following steps:
- applying a voltage between the working electrode and the counter electrode, so that the graphite and/or amorphous carbon are exfoliated under the action of electrolysis to generate a graphene oxide material;
- wherein, before and/or during applying the voltage, a light illumination is applied to the electrolysis system;
- the electrolysis system is the electrolysis system according to any one of embodiments of the present disclosure.

In some aspects, there is provided a method for preparing a halogenated graphene material in an electrolysis system, wherein, the electrolysis system comprises:
- a working electrode, in which the working electrode comprises graphite and/or amorphous carbon;
- a counter electrode, in which the counter electrode is an electrical conductor; and
- an electrolyte solution, in which the electrolyte solution is a conductive solution comprising a halogen ion and/or a halogen-containing complex ion;

wherein, the method comprises the following steps:
- applying a voltage between the working electrode and the counter electrode, so that the graphite and/or amorphous carbon is exfoliated under the action of electrolysis to generate halogenated graphene;
- wherein, before and/or during applying the voltage, a light illumination is applied to the electrolysis system.

The electrolysis system is the electrolysis system according to any one of the embodiments of the present disclosure.

In some embodiments, the working electrode and/or the electrolyte solution are subjected to light illumination during applying the voltage.

In some embodiments, the working electrode is subjected to light illumination during applying the voltage.

In some embodiments, the electrolysis system used in the method for preparing a graphene oxide material in an electrolysis system of the present disclosure is the electrolysis system according to any one of embodiments of the present disclosure.

In some embodiments, the electrolysis system used in the method for preparing a halogenated graphene material in an electrolysis system of the present disclosure is the electrolysis system according to any one of embodiments of the present disclosure.

In some embodiments, the graphene oxide according to any one of embodiments of the present disclosures is prepared by the method for preparing a graphene oxide material in an electrolysis system according to any one of embodiments of the present disclosure.

In some embodiments, the halogenated graphene according to any one of embodiments of the present disclosures is prepared the method for preparing a halogenated graphene material in an electrolysis system according to any one of embodiments of the present disclosure.

In some embodiments, the method for preparing a graphene oxide material in an electrolysis system according to any one of embodiments of the present disclosure produces the graphene oxide according to any one of embodiments of the present disclosure.

In some embodiments, the method for preparing a halogenated graphene material in an electrolysis system according to any one of embodiments of the present disclosure produces the halogenated graphene according to any one of embodiments of the present disclosure.

Terminology Description

The term "graphene oxide" refers to a two-dimensional carbon material in which an oxygen-containing functional group is attached to the surface and/or boundary of graphene oxide.

The term "single-layer graphene oxide" refers to a two-dimensional carbon material composed of 1 layer of graphene oxide.

The term "double-layer graphene oxide" refers to a two-dimensional carbon material composed of 2 layers of graphene oxide in laminated form.

The term "few-layer graphene oxide" refers to a two-dimensional carbon material composed of 3-9 layers of graphene oxide in laminated form.

The term "graphene oxide material" includes one or more selected from the group consisting of single-layer graphene oxide, double-layer graphene oxide, and few-layer graphene oxide. The graphene oxide material can be in the form of a powder or a dispersion solution.

The term "single-layer halogenated graphene" refers to a two-dimensional carbon material composed of 1 layer of halogenated graphene.

The term "double-layer halogenated graphene" refers to a two-dimensional carbon material composed of 2 layers of halogenated graphene in laminated form.

The term "few-layer halogenated graphene" refers to a two-dimensional carbon material composed of 3-9 layers of halogenated graphene in laminated form.

The term "halogenated graphene material" includes one or more selected from the group consisting of single-layer halogenated graphene, double-layered halogenated graphene, and few-layered halogenated graphene. The halogenated graphene material can be in the form of a powder or a dispersion solution.

The term "CGO" refers to a graphene oxide material prepared using a chemical method.

The term "EGO" refers to a graphene oxide material prepared using an electrochemical method.

The term "voltage" refers to a voltage difference between a working electrode and a counter electrode.

The term "xenon lamp" refers to an electric light source that emits a light from a discharge of xenon gas.

The term "ultraviolet lamp" refers to a light source capable of emitting an ultraviolet light.

The term "ultraviolet light" refers to a light having a wavelength of 10~400 nm.

In the present application, the method for calculating the carbon-to-oxygen atomic ratio according to XPS spectrum is as follows: first, the peak intensity values of carbon and oxygen in the XPS full spectrum are divided by their respective sensitivity factors (the sensitivity factors of carbon and oxygen are 0.296 and 0.711, respectively) to obtain the real intensity values of carbon and oxygen, and then the ratio of their real values is calculated to obtain the carbon-to-oxygen atomic ratio. The specific calculation formula is as follows:

$$\frac{C}{O} = \frac{I(C)}{0.296} \div \frac{I(O)}{0.711}$$

wherein, I(C) and I(C) represent the peak intensity values (i.e. peak areas) of carbon and oxygen in the XPS full spectrum, respectively.

In the present application, the method for calculating the peak area ratio of carboxyl group to non-carboxyl group (hydroxyl and ether groups) according to the XPS spectrum is as follows: first, the fine spectrum of C $1s$ of XPS spectrum is fitted and subjected to a peak-split process, and the peak corresponding to carboxyl group and the peak corresponding to non-carboxyl groups (hydroxyl and ether groups) are obtained after the peak-split process, and then the area ratio of the two peaks is calculated.

In this application, comprising, including and containing may refer to a content of 1 to 100 wt %, such as 10 wt % or more, such as 20 wt % or more, such as 30 wt % or more, such as 40 wt % or more, such as 50 wt % or more, such as 60 wt % or more, such as 70 wt % or more, such as 80 wt % or more, such as 90 wt % or more, such as 100%.

Beneficial Effect

The methods or products of the present disclosure have one or more of the following advantages:
1) it is found in the present disclosure that when a graphene oxide is electrochemically prepared, applying a specific light illumination can improve the degree of oxidation of the product;
2) in the graphene oxide material obtained by some methods of the present disclosure, the carbon-to-oxygen atomic ratio is relatively low, for example, it can reach 3 or lower;
3) in the XPS spectrum of the graphene oxide material obtained by some methods of the present disclosure, the area ratio of carboxyl peak to non-carboxyl peak can be as low as 0.33:1, or as high as 2:1;
4) in the solid product obtained by some methods of the present disclosure, the proportion of the single-layer graphene oxide can reach 90%;
5) some methods of the present disclosure can realize the large-scale production of graphene oxide;
6) some methods for preparing graphene oxide material of the present disclosure are simple;
7) some methods for preparing graphene oxide materials of the present disclosure are safe;
8) some methods for preparing graphene oxide material of the present disclosure are environmentally friendly;
9) some methods for preparing graphene oxide material of the present disclosure save time.

SPECIFIC MODELS FOR CARRYING OUT THE PRESENT INVENTION

The embodiments of the present invention are described in detail below with reference to the examples, but those skilled in the art will understand that the following examples are only used to illustrate the present invention, and should not be regarded as limiting the scope of the present invention. If a specific condition is not indicated in the examples, it is carried out according to the conventional condition or the condition suggested by the manufacturer. The reagents or instruments used without the manufacturer's indication are conventional products that can be obtained from the market.

Figure 14:
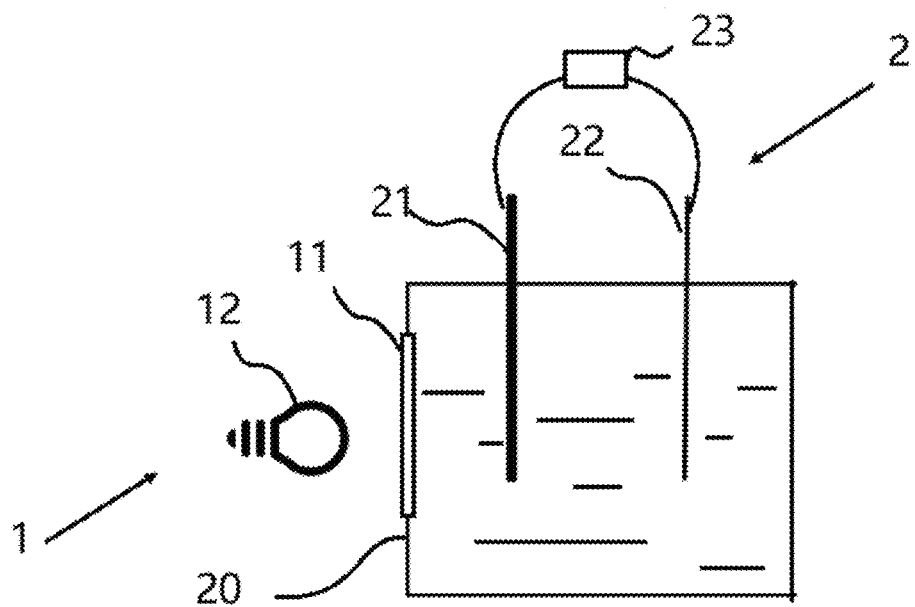
FIG. 14 shows the schematic diagram of an electrolysis system of one example.

FIG. 14 shows a schematic diagram of an electrolysis system. The electrolysis system can be used to implement the method for preparing a graphene oxide or the method for preparing a halogenated graphene of the present disclosure. The electrolysis system comprises a light treatment device 1 and an electrolysis device 2. The light treatment device 1 comprises a light source 12. The light source 12 is used to illuminate the electrolyte solution in the electrolysis system. The electrolysis device 2 comprises an electrolysis vessel 20, a working electrode 21, a counter electrode 22 and a power source 23. The electrolysis vessel 20 is used to contain the electrolyte solution and provide a place where an electrolysis reaction occurs. The power source 23 is respectively electrically connected to the working electrode 21 and the counter electrode 22 to provide the electric energy required for electrolysis. In this embodiment, the electrolysis vessel 20 is provided with a light-transmitting structure 11, and the light source 12 can illuminate the interior of the electrolysis vessel 20 through the light-transmitting structure 11, thereby illuminating the electrolyte solution inside the electrolysis vessel 20.

Example 1.1

A graphene oxide was electrochemically prepared using the above electrolysis system, in which the working electrode 21 was a graphite rod (8 mm in diameter, purchased from Qingdao Dadi Carbon Technology Co., Ltd.), the counter electrode 22 was a Pt sheet, and 250 mL of an aqueous solution containing 0.1 M oxalic acid and 0.05 M $Na_2SO_4$ was used as the electrolyte solution.

The electrolysis vessel 20 was a transparent electrolysis cell (5×5×15 cm), in which the working electrode 21 and the counter electrode 22 were placed.

The method for preparing graphene oxide material by electrolysis comprised: a voltage was applied between the working electrode and the counter electrode, and the voltage program was as follows: firstly, a square wave voltage was applied for 20 minutes, and the square wave voltage program was as follows: square wave period T=2 s, in one cycle, 10V was maintained for 1 s, and −0.5V was maintained for 1 s. Then, a constant voltage of 15V was applied for 5 hours.

The electrolyte solution was illuminated with a xenon lamp (CME-Xe300UV Xenon lamp, luminescence spectral range: 200~2500 nm) throughout the electrolysis. The optical power density of the xenon lamp was 450 mW/$cm^2$, and the spot diameter was 5 cm (equivalent to an optical power of 8.8 W). Other than that, there were no other light sources.

During electrolysis, it was found that after applying a constant voltage (15V) for 5 minutes, the electrolyte solution showed a light yellow color, indicating that graphene oxide had been formed. After the electrolysis, a solid powder was filtered and collected from the electrolyte solution, the collected solid powder was dispersed in N,N-dimethylformamide under ultrasonic, then a solid was filtered and collected, which was the graphene oxide material.

Examples 1.2~1.8

Examples 1.2 to 1.8 differed from Example 1.1 in the parameter differences, and the specific differences were shown in the following table:

| Example No. | 1.1 | 1.2 | 1.3 | 1.4 | 1.5 | 1.6 | 1.7 | 1.8 |
|---|---|---|---|---|---|---|---|---|
| Constant voltage/V | 15 | 10 | 15 | 15 | 15 | 15 | 15 | 15 |
| Oxalic acid concentration/M | 0.1 | 0.1 | 0.01 | 0.05 | 0.2 | 0.1 | 0.1 | 0.1 |
| Time/hour | 5 | 5 | 5 | 5 | 5 | 3 | 7 | 9 |
| Yield/g | 2.5 | 1.2 | 0.7 | 1.1 | 2.0 | 1.4 | 3.7 | 4.1 |

Examples 2.1~2.5

Examples 2.1 to 2.5 differed from Example 1.1 in some parameter differences, which were shown in the following table for details. For other steps and parameters not described in detail, they were all referred to Example 1.1.

The light with wavelength of 200~400 nm was obtained by the following method: a short-pass filter was used to block a xenon lamp (CME-Xe300UV Xenon lamp, the emission spectrum range was 200~2500 nm) to filter out the light above 400 nm, and thus the light with wavelength of 200~400 nm was obtained, the optical power density was adjusted to 450 mW/cm$^2$, and the spot diameter was 5 cm. Other than that, there were no other light sources.

Comparative Example D1

Comparative Example D1 differed from Example 1.1 only in that the whole preparation process was carried out under natural light without direct sunlight in the summer afternoon. Other steps and parameters were the same. The obtained product was numbered as EGO-D1.

Comparative Example D2

Comparative Example D2 differed from Example 2.2 only in that the whole preparation process was carried out under natural light without direct sunlight in the summer afternoon. Other steps and parameters were the same. The obtained product was numbered as EGO-D2.

The preparation method parameters and product property parameters of Examples 1.1, 2.1~2.5, and Comparative Examples D1~D2 were shown in the following table: including electrolyte solution composition, working electrode, light illumination wavelength, constant voltage, electrolysis time, product weight, proportion of single-layer graphene oxide sheets in product, area ratio of C1s peak to O1s peak in XPS spectrum of product, carbon-to-oxygen atomic ratio in product, and area ratio of carboxyl peak to non-carboxyl peak in product.

and D2 were natural light. In order to compare the effect of light source on the content of hydroxyl radicals in the solution, the following analysis was carried out:

A freshly prepared 250 mL of chromogenic solution was provided, the chromogenic solution was an aqueous solution containing methylene blue (radicals (such as OH) would oxidize the chromogenic solution, causing its color to become lighter) and oxalic acid, the concentration of methylene blue was $10^{-6}$ M, the concentration of oxalic acid was 0.1M. The chromogenic solution was placed in a transparent electrolysis cell (15×15×30 cm).

The xenon lamp of Example 1.1, the short-wave xenon lamp of Example 2.1 and the natural light of Comparative Example D1/D2 were used to illuminate the above-mentioned chromogenic solution respectively, and an ultraviolet photometer was used to record the absorbance $A_0$ of the chromogenic solution at a wavelength of 650 nm before the experiment started, and the absorbance values of the chromogenic solution when the illustration was performed for 0.5 h, 1 h, 2 h and 3 h ($A_n$, n=0.5, 1, 2, 3). When calculating absorbance, the decrease in absorbance of the chromogenic solution itself caused by simple illumination was deducted. From the detected absorbance values, the absorbance decrease rate $\eta_n$ was calculated:

$$\text{Absorbance decrease rate } \eta_n = \frac{A_0 - A_n}{A0} \times 100\%$$

The results were as follows:

|  | 1.1 | 2.1 | 2.2 | 2.3 | 2.4 | 2.5 | D1 | D2 |
|---|---|---|---|---|---|---|---|---|
| Electrolyte solution | 0.1M Oxalic acid | 0.1M Oxalic acid | 0.1M Formic acid | 0.1M Tricarballylic acid 0.05M Na$_2$SO$_4$ | 0.1M Butanetetracarboxylic acid | 0.1M Formic acid | 0.1M Oxalic acid | 0.1M Formic acid 0.05M Na$_2$SO$_4$ |
| Working electrode | Graphite rod | Graphite rod | Graphite rod | Graphite rod | Graphite rod | Charcoal rod | Graphite rod | Graphite rod |
| Light wavelength/nm | 200-2500 |  |  | 200-400 |  |  | Natural light |  |
| Constant voltage/V | 15 V | 30 V | 30 V | 30 V | 30 V | 30 V | 15 V | 30 V |
| Electrolysis time/h | 5 h | 5 h | 5 h | 5 h | 5 h | 5 h | 5 h | 5 h |
| Product weight/g | 2.5 g | 4.0 g | 6.0 g | 2.8 g | 5.5 g | 0.8 g |  | 5.7 g |
| Proportion of single-layer graphene oxide sheets | 90% | 90% | 90% | 90% | 90% | 10% |  | 90% |
| Area ratio of C1s peak to O1s peak | 1.08:1 | 0.87:1 | 0.96:1 | 1.79:1 | 1.37:1 | 2.16:1 |  | 1.12:1 |
| Carbon-to-oxygen atomic ratio | 2.6:1 | 2.1:1 | 2.3:1 | 4.3:1 | 3.3:1 | 5.2:1 | 3.2:1 | 2.7:1 |
| Area ratio of carboxyl peak to non-carboxyl peak | 0.46:1 | 0.36:1 | 2.0:1 | 0.38:1 | 1.27:1 | 0.33:1 |  | 1.81:1 |

Comparative Example D3

Chemically synthesized graphene oxide (CGO) was prepared by Hummers method.

Specifically, graphite powder (1.0 g) and NaNO$_3$ (0.8 g) were added to concentrated sulfuric acid in an ice bath and stirred, and then KMnO$_4$ (4.5 g) was slowly added thereto. The temperature was then raised and stirring was continued at 38° C. for 5 days. Finally, water and hydrogen peroxide at a concentration of 30 wt % were added. The resulting suspension was dialyzed, centrifuged and concentrated for later use. The obtained product was numbered as CGO.

Comparison of Light Illumination Characteristics of Examples 1.1 and 2.1 with Comparative Examples D1 and D2

The light sources of Examples 1.1 and 2.1 were xenon lamp, and the light sources of Comparative Examples D1

| Absorbance decrease rate $\eta_n$ | Light illumination time/h | | | |
|---|---|---|---|---|
|  | 0.5 | 1 | 2 | 3 |
| Example 1.1 | 28.6% | 52.1% | 51.6% | 49.8% |
| Example 2.1 | 24.3% | 47.8% | 46.2% | 45.1% |
| Natural light | 0.01% | 0.017% | 0.038% | 0.057% |

The above results showed that the natural light hardly caused discoloration of the chromogenic solution. The light illumination in Examples 1.1 and 2.1 rapidly decreased the absorbance of the chromogenic solution.

Analysis and Detection

Figure 1:
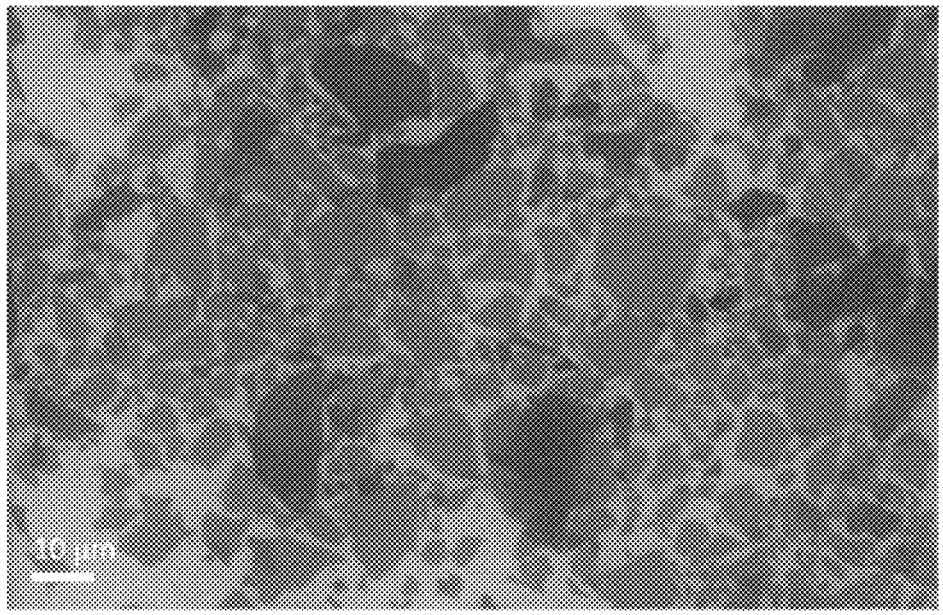
FIG. 1 shows the scanning electron microscope photograph of the EGO of Example 1.1.

FIG. 1 showed a scanning electron microscope photograph of the EGO of Example 1.1. As shown in the figure, the average sheet size of EGO was 1.5 µm, and the EGO with sheet size ranging from 1 to 2 μm accounted for 55%. The sheet diameter size distribution of EGO was shown in the table below.

| Sheet diameter/μm | <1 | 1-2 | 2-4 | 4-10 | 4-10 |
|---|---|---|---|---|---|
| Percent/% | 17 | 55 | 16 | 11 | 1 |

Figure 2:
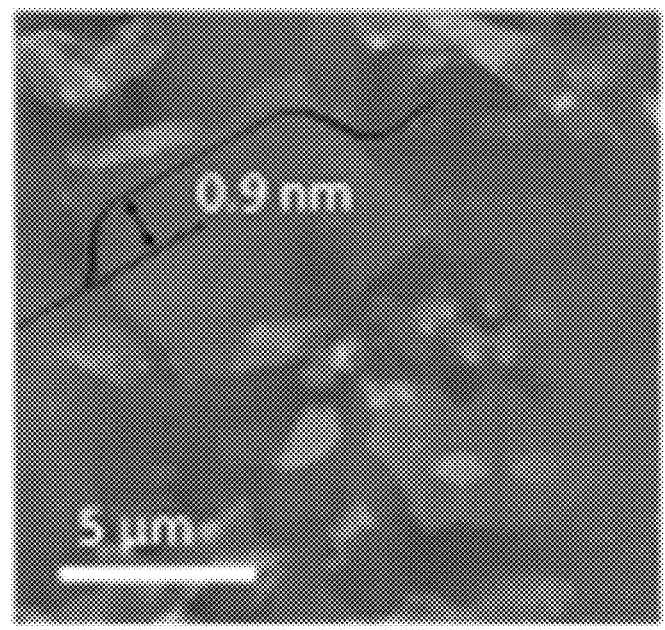
FIG. 2 shows the atomic force microscope photograph of the EGO of Example 1.1.

FIG. 2 showed an atomic force microscope photograph of the EGO of Example 1.1. As shown in the figure, the thickness of the single-layer EGO was about 0.9 nm. The layer number distribution of the EGO was shown in the table below.

| Layers | 1 | 2 | 3 | 4-10 |
|---|---|---|---|---|
| Percent/% | 92.6 | 4.4 | 2.1 | 0.9 |

Figure 3:
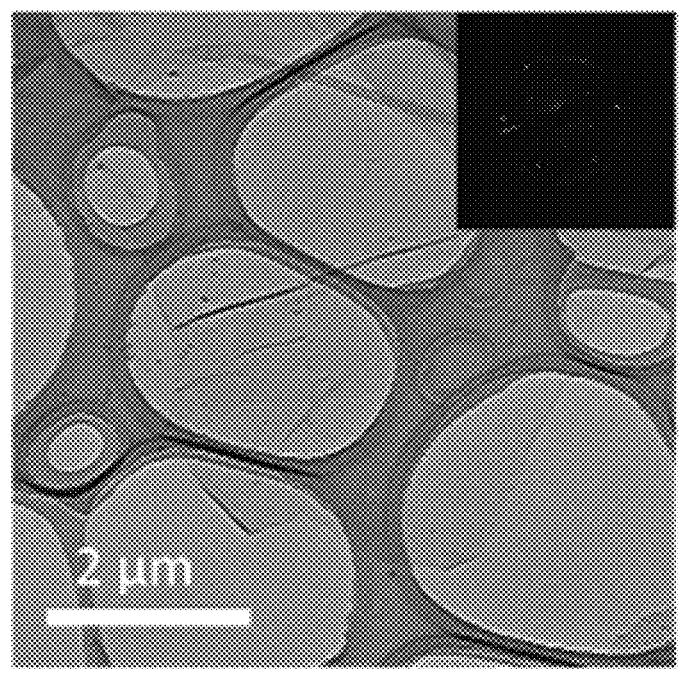
FIG. 3 shows the transmission electron microscope photograph of the EGO of Example 1.1.

FIG. 3 showed a transmission electron microscope photograph of the EGO of Example 1.1. The inset of FIG. 3 was the electron diffraction pattern. As shown in the figure, the EGO was in a transparent state, and the electron diffraction pattern had a six-fold symmetrical structure, indicating that the EGO of Example 1.1 had a high degree of crystallinity.

The X-ray diffraction analysis was performed on powdered EGO (Example 1.1), CGO (Comparative Example D3) and unexfoliated graphite.

Figure 4:
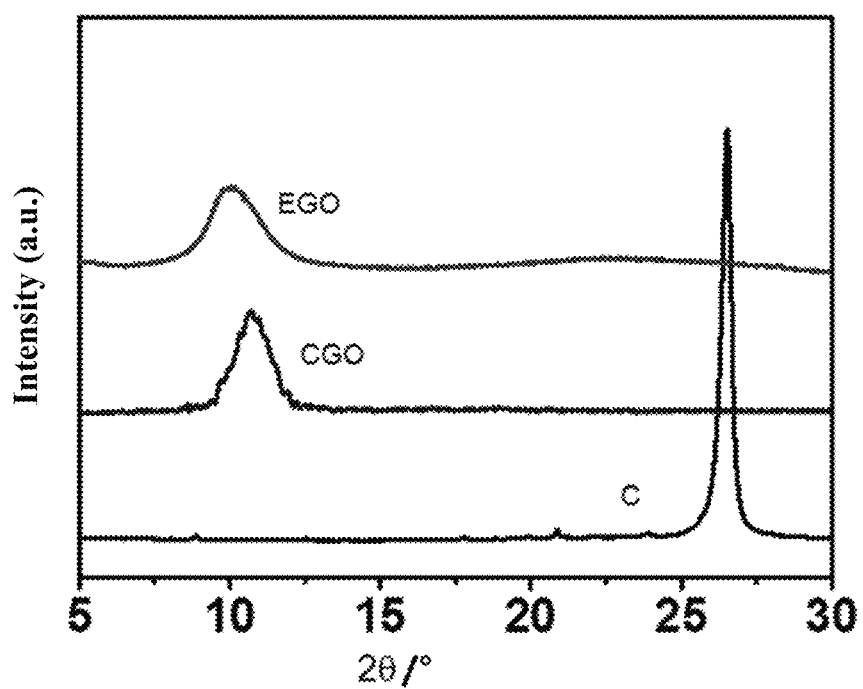
FIG. 4 shows the XRD patterns of the EGO of Example 1.1, of the CGO of Comparative Example 3 and of unexfoliated graphite (C).

FIG. 4 showed the XRD patterns of powdered EGO (of Example 1.1), CGO (Comparative Example 3D) and unexfoliated graphite (C). The unexfoliated graphite powder had a narrow half-width peak near 2θ=26°, while an obvious peak near this 2θ angle could hardly be observed for the EGO, which indicated that the interlayer spacing of EGO was significantly different from that of unexfoliated graphite, and the layers of EGO were randomly stacked. At the same time, EGO and CGO had a broad half-width peak near 2θ=10.

The EGO of Example 1.1 was characterized by surface-enhanced Raman spectroscopy (SERS).

Figure 5:
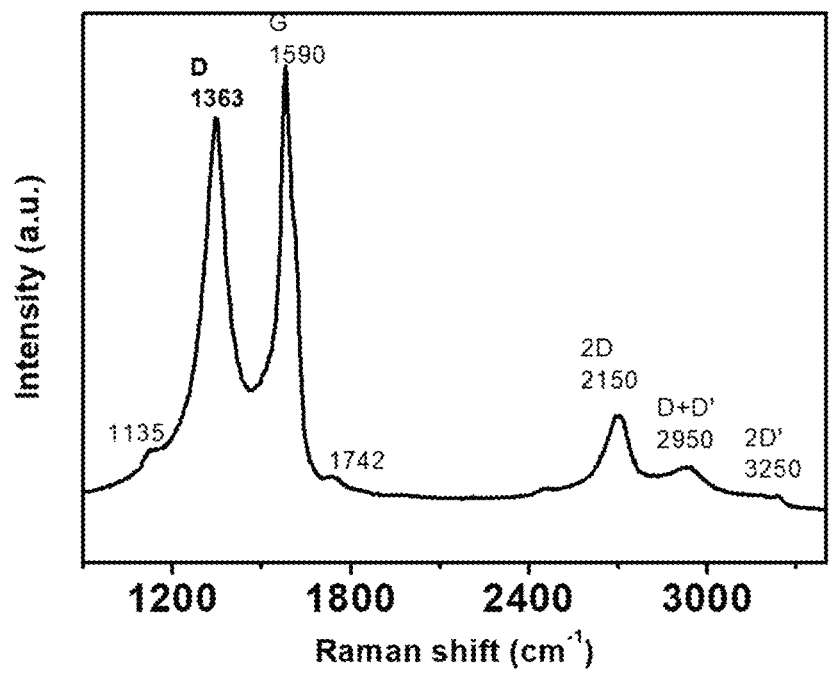
FIG. 5 shows the SERS spectrum of the EGO of Example 1.1.

FIG. 5 showed the SERS spectrum of the EGO of Example 1.1. As shown in the figure, there were five characteristic peaks D, G, 2D, D+D' and 2D' in the figure. Among them, the G peak (G-band) was located near 1590 $cm^{-1}$, the D peak (D-band) was located near 1363 $cm^{-1}$, and the intensity ratio of the D peak to the G peak was greater than 1. In addition, there were two characteristic peaks at 1135 $cm^{-1}$ and 1742 $cm^{-1}$, which existed in the form of shoulder peaks of the G peak and the D peak, respectively, and they were the vibration peaks of C—O and C=O, respectively, indicating the existence of oxygen-containing functional groups in EGO.

Fourier transform infrared absorption spectrometer (FTIR) was used to characterize the EGO of Example 1.1 and the CGO of Comparative Example D3.

Figure 6:
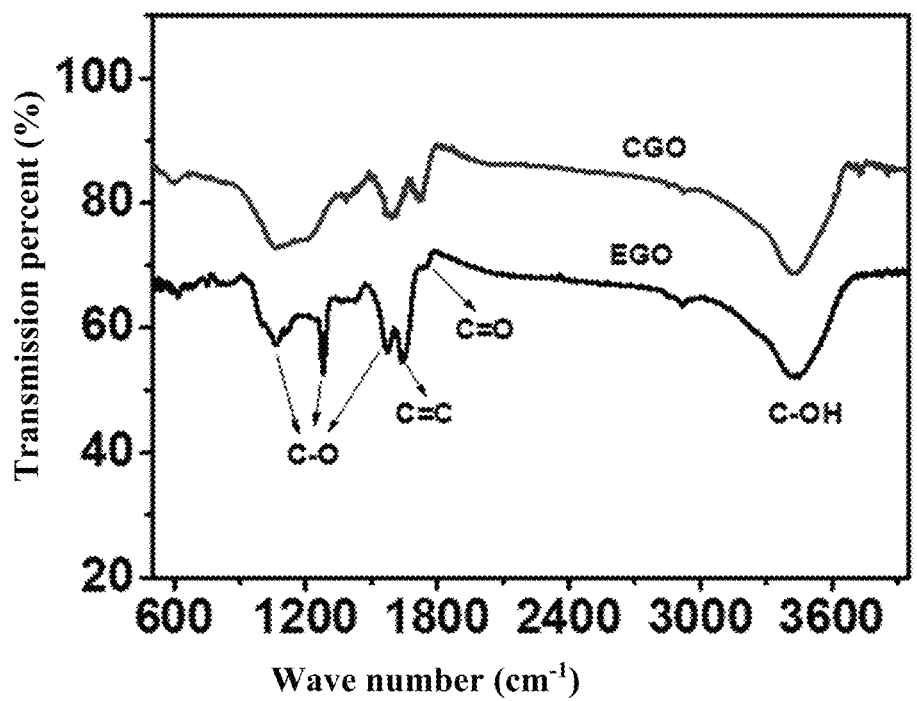
FIG. 6 shows the FTIR spectra of the EGO of Example 1.1 and of the CGO of Comparative Example D3.

FIG. 6 showed the FTIR spectra of the EGO of Example 1.1 and of the CGO of Comparative Example D3. As shown in the figure, there were peaks representing four functional groups C=O (1756 $cm^{-1}$), C—O (1063 $cm^{-1}$, 1281 $cm^{-1}$, 1569 $cm^{-1}$), C=C (1644 $cm^{-1}$) and O—H (3439 $cm^{-1}$) functional group peaks. In addition, although the C=O (1756 $cm^{-1}$) peak of the EGO was weaker than the corresponding peak of the CGO, it was still clearly visible, indicating that the EGO of Example 1.1 had a higher degree of oxidation. In addition, the intensity of the C=O peak was lower than that of the C—O peak, indicating that the EGO contained more C—O functional groups.

The EGO of Example 1.1, the EGO of Comparative Example D1 and the CGO of Comparative Example D3 were characterized by X-ray photoelectron spectroscopy (XPS).

Figure 7:
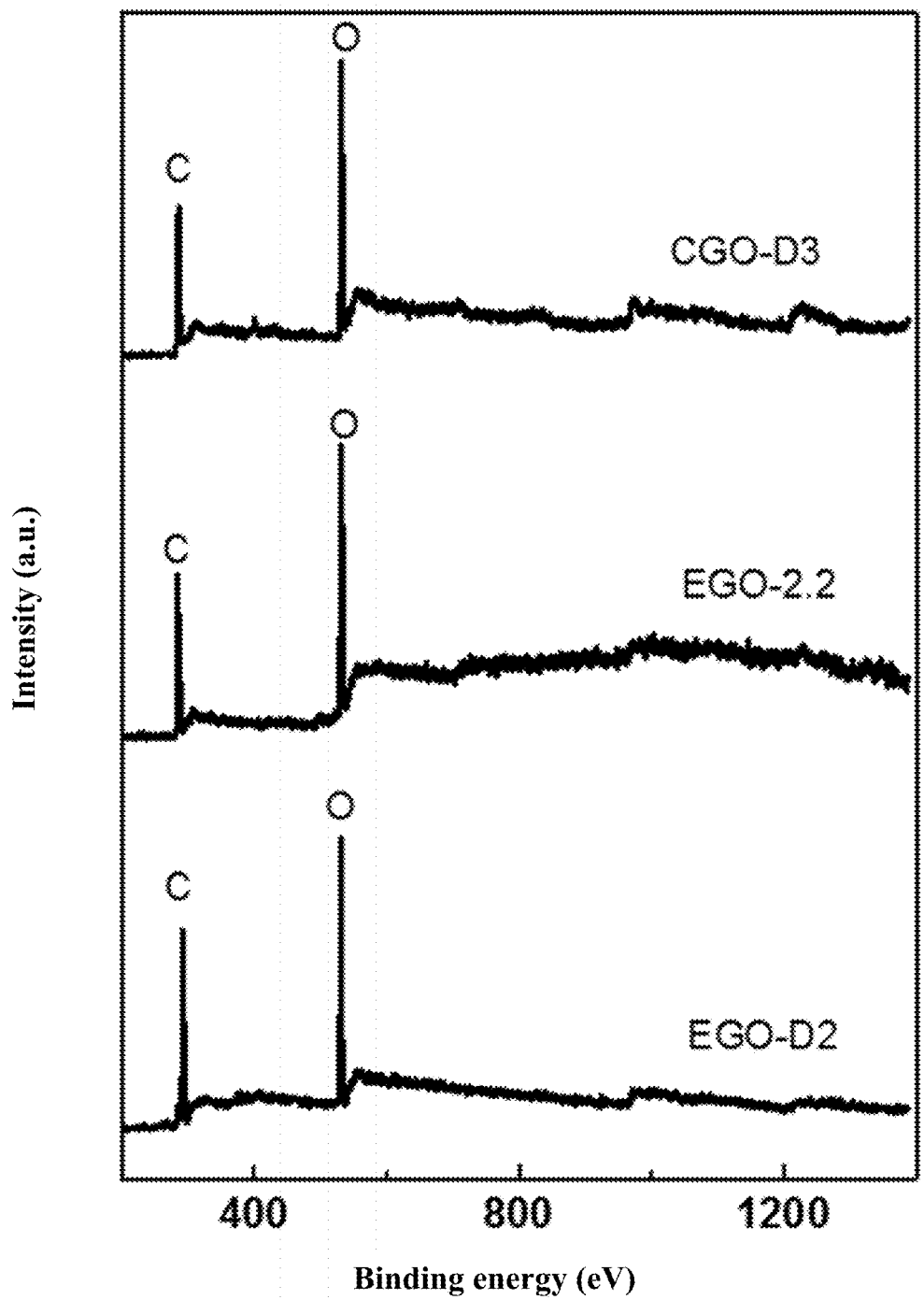
FIG. 7 shows the XPS patterns of the EGO of Example 2.2, of the EGO-D2 of Comparative Example D2 and of the CGO of Comparative Example D3.

FIG. 7 showed the XPS patterns of the EGO-2.2 of Example 2.2, of the EGO-D2 of Comparative Example D2 and of the CGO of Comparative Example D3. The figure showed the C1s peak and the O1s peak of graphene oxide.

According to the calculation for the patterns in FIG. 7, the carbon/oxygen atomic ratio (C/O) of the EGO-2.2 of Example 2.2 was 2.3:1, and the carbon/oxygen atomic ratio (C/O) of the EGO-D2 of Comparative Example D2 was 2.7:1. EGO-2.2 had a lower carbon-to-oxygen atomic ratio than EGO-D2, indicating that EGO-2.2 had a higher degree of oxidation. It could be seen that the light illumination could indeed improve the oxidation degree of the electrochemically prepared EGO.

In addition, Example 2.2 also had a higher yield than Comparative Example 2.2. This indicated that the light illumination could also improve the yield of the electrochemically prepared EGO.

The carbon/oxygen atomic ratio (C/O) of EGO-2.2 of Example 2.2 was 2.3:1, and the carbon/oxygen atomic ratio (C/O) of CGO of Comparative Example D3 was 2.3:1, which showed that the graphene oxide material obtained by the method of Example 2.2 had a comparable degree of oxidation as compared with the Hummer's method.

In addition, the carbon-to-oxygen atomic ratios of the graphene oxide products of Example 1.1 and Comparative Example D1 were also detected. The carbon/oxygen atomic ratio (C/O) of EGO-1.1 of Example 1.1 was 2.6:1, and the carbon/oxygen atomic ratio (C/O) of EGO-D1 of Comparative Example D1 was 3.2:1. EGO-1.1 had a lower carbon-to-oxygen atomic ratio than EGO-D1, indicating that EGO-1.1 had a higher degree of oxidation. It could be seen that the light illumination could indeed improve the oxidation degree of the electrochemically prepared EGO.

Figure 9:
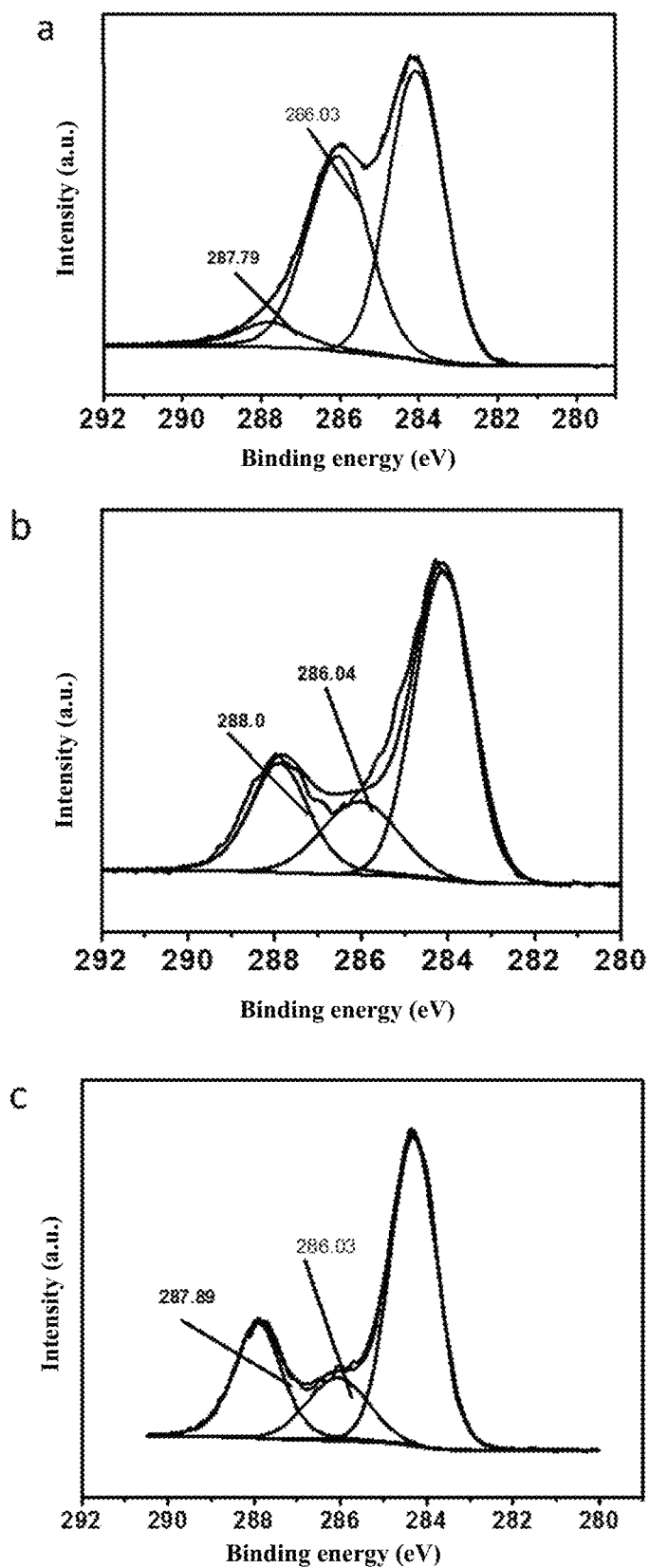
FIG. 9 shows the fitting patterns of the fine spectra of the C is peaks of the XPS patterns of the EGOs of Example 1.1 (FIG. 9a), of Example 2.4 (FIG. 9b) and of Example 2.2 (FIG. 9c).

FIG. 9 showed the fitting patterns of the fine spectra of the C 1s peaks of the XPS patterns of the EGOs of Example 1.1 (FIG. 9a), of the EGOs of Example 2.4 (FIG. 9b) and of the EGOs of Example 2.2 (FIG. 9c). As shown in the figures, the horizontal axis was the binding energy and the vertical axis was the intensity. The peaks around 287.8~288.3 eV correspond to carboxyl groups, the peaks around 285.8~286.3 eV correspond to non-carboxyl groups (hydroxyl and ether groups), and the peaks around 284~284.5 eV correspond to alkenyl groups.

As shown in FIG. 9a, for the EGO of Example 1.1, the area ratio of carboxyl peak (that was, the peak representing C=O) to non-carboxyl peak (that was, the superposition of the peaks representing C—OH and C—O—C) in the XPS pattern was 1.8:1.

As shown in FIG. 9b, for the EGO of Example 2.4, the ratio of carboxyl peak to non-carboxyl peak in the XPS pattern was 1.27:1.

As shown in FIG. 9c, for the EGO of Example 2.2, the ratio of carboxyl peak to non-carboxyl peak in the XPS pattern was 2.0:1. In contrast, the ratio of carboxyl peak to non-carboxyl peak in the XPS pattern of the EGO of Comparative Example 2D was 1.81:1.

The above experimental results showed that using an electrolyte solution containing oxalic acid, formic acid or butanetetracarboxylic acid in combination with light illumination could obtain graphene oxide with a higher proportion of carboxyl groups.

Thermogravimetric analysis was performed on the EGO of Example 1.1 and the CGO of Comparative Example D3.

Figure 8:
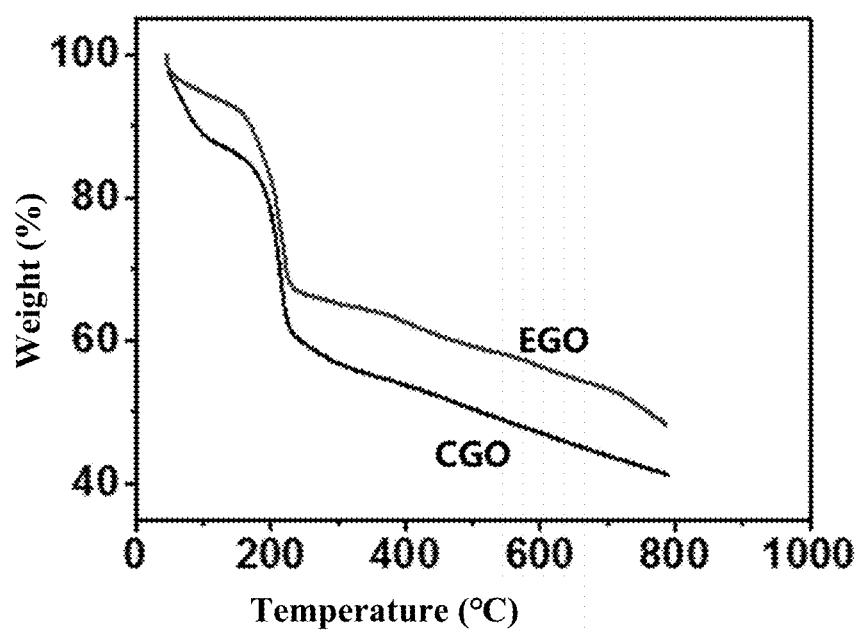
FIG. 8 shows the CGO thermogravimetric curves of the EGO of Example 1.1 and of the CGO of Comparative Example D3.

FIG. 8 showed thermogravimetric curves of the EGO of Example 1.1 and of the CGO of Comparative Example D3. As shown, the overall weight change trends of EGO and CGO were similar. The weight loss in the temperature range below and at 100° C. was due to the evaporation of a small amount of water in their adsorption environment. The rapid weight loss in the range of 100~220° C. was caused by the reduction of most of the oxygen-containing functional groups to produce gases such as CO and $CO_2$. During the heating from 100° C. to 800° C., the mass loss of EGO was about 41%, and the mass loss of CGO was about 47%. From this, it could be inferred that EGO and CGO had similar oxidation degrees.

From the above data, it could be known that the graphene oxide with a higher degree of oxidation was obtained by the method of the examples by applying light illumination to the electrolysis system, and the oxidation degree of the graphene oxide was significantly higher than that prepared by applying natural light, and was comparable to the degree of oxidation of the graphene oxide prepared by the Hummers method.

In addition, the method of the examples also had the advantages of high production efficiency, high proportion of single-layer graphene oxide in the graphene oxide material, and large graphene oxide sheet diameter.

Example 3

The EGO prepared in Example 1.1 was dispersed in 50 mL of water to obtain a dispersion of 0.5 μg/mL. The above dispersion was filtered using a 0.2 μm pore size PTFE filter membrane at a negative pressure of 0.1 bar, so that EGO was deposited on the PTFE membrane as a membrane. The deposited membrane on the PTFE membrane was dried at 50° C. for 24 h to obtain a dry EGO membrane with a thickness of 220 nm.

The dried EGO membrane was placed in a 0.25 M aniline solution (the solvent was an aqueous ethanol solution, and the volume ratio of ethanol to water was 1:1) for 24 hours, taken out and washed, and then dried at 50° C. for 24 h to obtain a dry MEGO membrane with a thickness of 220 nm.

Figure 10:
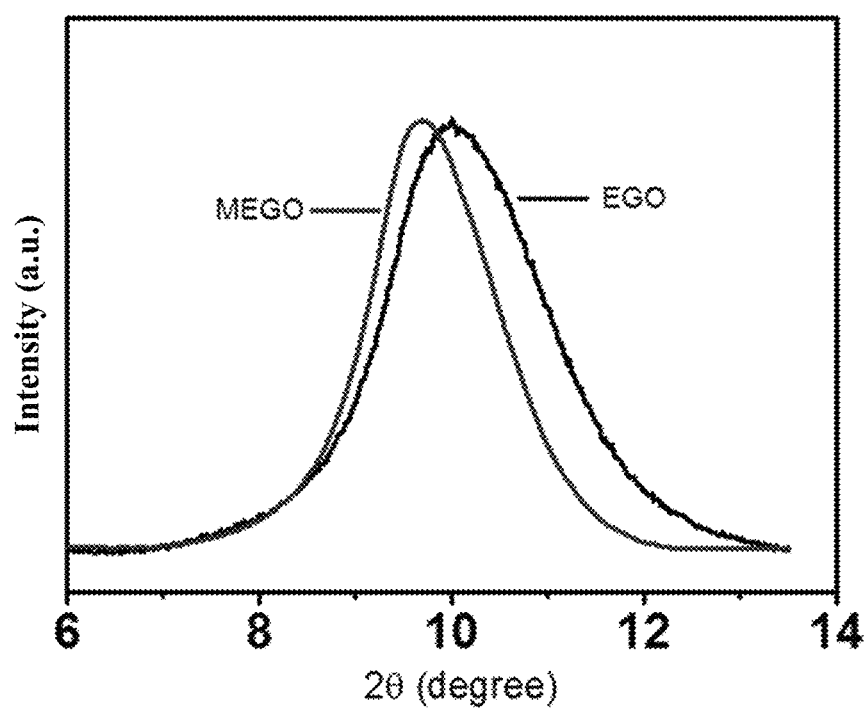
FIG. 10 shows the XRD patterns of the EGO membrane and of the MEGO membrane of Example 3.

X-ray diffraction (XRD) analysis was performed on the EGO membrane and MEGO membrane. FIG. 10 showed the XRD patterns of the EGO membrane and of the MEGO membrane. As shown in the figure, MEGO membrane and EGO membrane had characteristic peaks around 2θ=10°, but the 2θ angles of the characteristic peaks of the two were slightly different, and the MEGO membrane had a smaller 2θ angle, which indicated that the interlayer spacing of the graphene oxide in the MEGO membrane was increased in some extent as compared to that of the EGO membrane.

Figure 11:
FIG. 11 shows the cross-sectional scanning electron microscope photograph of the MEGO membrane of Example 3.

FIG. 11 showed a cross-sectional electron microscope photograph of the MEGO membrane. As shown, the MEGO membrane had a compact layered structure.

The water flux test was carried out on the EGO membrane and MEGO membrane. The test method was as follows: first, the volume of water flowing through the membrane was measured under different water pressures, and then the volume of water was divided by the area of the membrane and the measurement time. The result was the water flux, and the results were as follows:

| Flux/L m$^{-2}$h$^{-1}$ | Water pressure/bar | | | | |
|---|---|---|---|---|---|
| | 1 | 2 | 3 | 4 | 5 |
| EGO membrane | 3.01 | 6.13 | 8.80 | 12.15 | 15.57 |
| MEGO membrane | 4.72 | 9.01 | 11.98 | 16.3 | 19.87 |

As shown in the table above, the water flux of the MEGO membrane was about 1.6 times higher than that of the EGO membrane under the water pressure of 1-5 bar.

The NaCl retention rates of the EGO membrane and MEGO membrane were detected at different time intervals. The detection method was as follows: first, the conductivity of the sodium chloride aqueous solution before passing through the membrane was measured, then the sodium chloride aqueous solution was subjected to the nanofiltration membrane treatment at a pressure of 5 bar, and finally the diluted sodium chloride solution collected after the nanofiltration membrane treatment was subjected to conductivity test. The retention rate of salt could be obtained from the relation between the conductivity and the ion concentration. The results were shown in the table below.

| Time (minutes) | 5 | 10 | 20 | 30 | 60 | 90 |
|---|---|---|---|---|---|---|
| EGO membrane retention rate (%) | 23.1 | 25.6 | 28.8 | 29.9 | 31.4 | 32.8 |
| MEGO membrane retention rate (%) | 27.8 | 38.2 | 46.9 | 51.5 | 58.2 | 59.4 |

The retention rates of NaCl, KCl, and $MgCl_2$ for the EGO membrane and MEGO membrane were detected respectively. The detection method was as follows: first, the electrical conductivity of the aqueous solutions of the three salts before passing through the membranes was measured, and then the three aqueous solutions were subjected to the nanofiltration membrane treatment under a pressure of 5 bar, and finally the diluted solution collected after the nanofiltration membrane treatment was subjected to conductivity test. The retention rate of salt could be obtained from the relation between the conductivity and the ion concentration. The results were shown in the table below.

| | NaCl | KCl | $MgCl_2$ |
|---|---|---|---|
| EGO membrane retention rate (%) | 31.4 | 39.9 | 47.8 |
| MEGO membrane retention rate (%) | 58.2 | 64.9 | 71.8 |

The above test results demonstrated that MEGO membrane had improved water flux and enhanced ion retention rate as compared to the EGO membrane. Therefore, the MEGO membrane was very suitable for desalination/dessalement of water.

Example 4: Preparation and Characterization of Chlorinated Graphene Oxide

Chlorinated graphene oxide was prepared using the same two-electrode system as used in Example 1.1, wherein the graphite rod was used as the working electrode, the Pt sheet was used as the counter electrode, and the electrolyte solution was 0.1 M NaCl.

The electrolysis cell was subjected to light illumination, and the light illumination conditions were the same as those in Example 2.1.

Then, a square wave voltage was applied to the two-electrode system, and the square wave voltage program was as follows: the square wave period T=4 s, in one cycle, 10V was maintained for 1 s, and 0V was maintained for 3 s. The electrolysis time was 6 h.

After electrolysis, the electrolyte solution was filtered with a polytetrafluoroethylene (PTFE) filter membrane with a pore size of 0.2 μm to obtain a solid powder. The solid powder was washed with water, filtered, and the above operation was repeated 3 times. The collected solid powder was dispersed in N,N-dimethylformamide, subjected to ultrasonic for 15 minutes in an ice-water bath, then the product after ultrasonic was suction filtrated with a PTFE filter membrane, and a solid product was finally collected with a mass of 0.20 g.

Comparative Example 4

Comparative Example 4 differed from Example 4 in that natural light was used instead of the xenon lamp equipped with filter. Condition of natural light was the same as D1 The mass of the product was 0.98 g.

XPS Analysis

The electrolysis products of Example 4 and Comparative Example 4 were subjected to XPS analysis.

Figure 12:
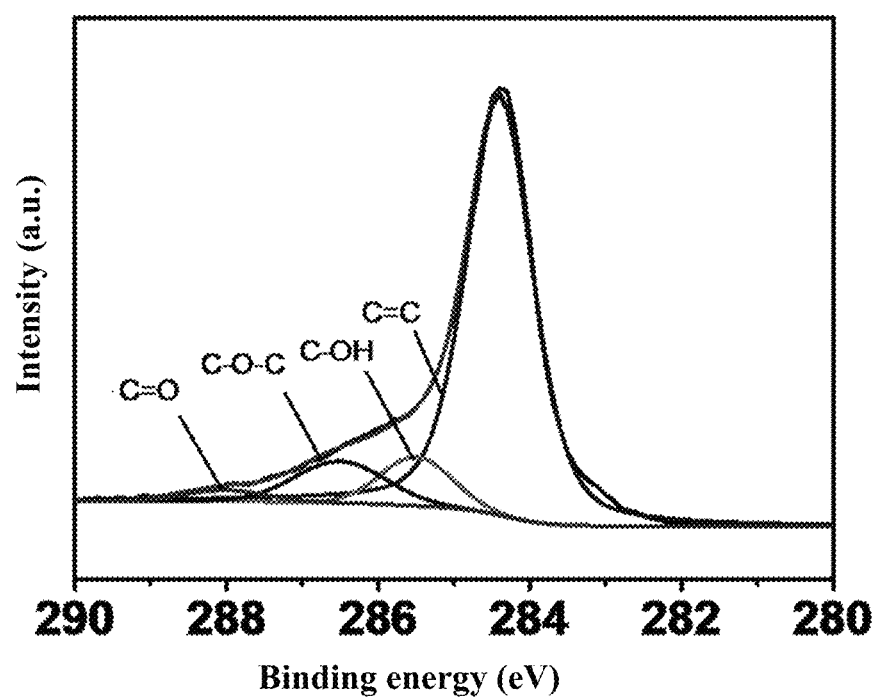
FIG. 12 shows the XPS spectrum of the electrolysis product of Comparative Example 4.

FIG. 12 showed the XPS spectrum of the electrolysis product of Comparative Example 4, specifically the fine spectrum of C1s. The fine spectrum was fitted and subjected to a peak-split process, and no peak corresponding to C—Cl (286.8 eV) group was observed, and the corresponding fitting peak of the electron binding energy was not observed. In addition, the bonding information of Cl was characterized in the range of 190~210 eV of the XPS spectrum, and no fine spectrum was observed. This showed that the Cl atom did not form a bond with the C atom in graphene oxide, or the Cl content was extremely low, which was lower than the detection limit of XPS.

Figure 13:
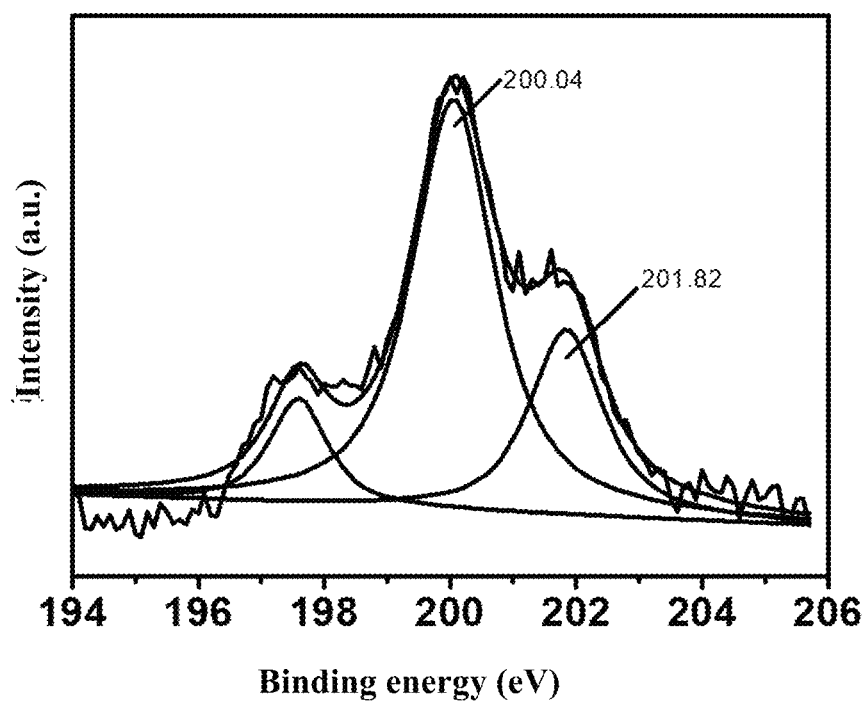
FIG. 13 shows the XPS spectrum of the electrolysis product of Example 4.

FIG. 13 showed the XPS spectrum of the electrolysis product of Example 4. After fitting and peak-split process of the spectrum in the range of 190~210 eV, two distinct peaks appeared near 200.04 eV and 201.82 eV, corresponding to the inner electron binding energy of 2p3/2 and 2p1/2 of Cl atom, respectively, which were close to the values of the inner electron binding energy of the Cl atom in the C—Cl bond. This indicated that chlorinated graphene oxide could be prepared under light illumination conditions.

Figure 15:
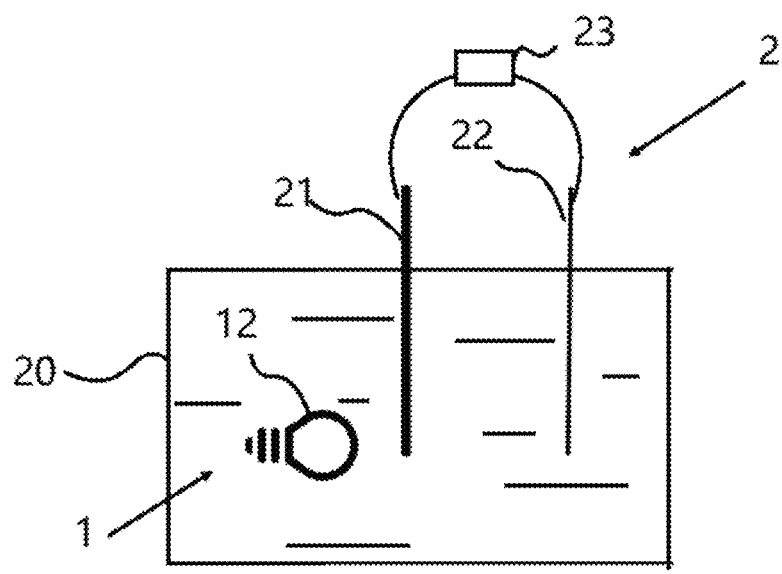
FIG. 15 shows the schematic diagram of an electrolysis system of yet another example.

FIG. 15 shows a schematic diagram of yet another electrolysis system. The electrolysis system can be used to implement the method for preparing a graphene oxide or the method for preparing a halogenated graphene of the present disclosure. The electrolysis system comprises a light treatment device 1 and an electrolysis device 2. The light treatment device 1 comprises a light source 12. The light source 12 is used to illuminate the electrolyte solution in the electrolysis system. The electrolysis device 2 comprises an electrolysis vessel 20, a working electrode 21, a counter electrode 22 and a power source 23, and the electrolysis vessel is used for accommodating an electrolytic solution and providing a place for electrolysis reaction to occur. The power source 23 is electrically connected to the working electrode 21 and the counter electrode 22, respectively. In this embodiment, the light source 12 is located inside the electrolysis vessel 20 and can illuminate the electrolyte solution in the electrolysis vessel 20.

Figure 16:
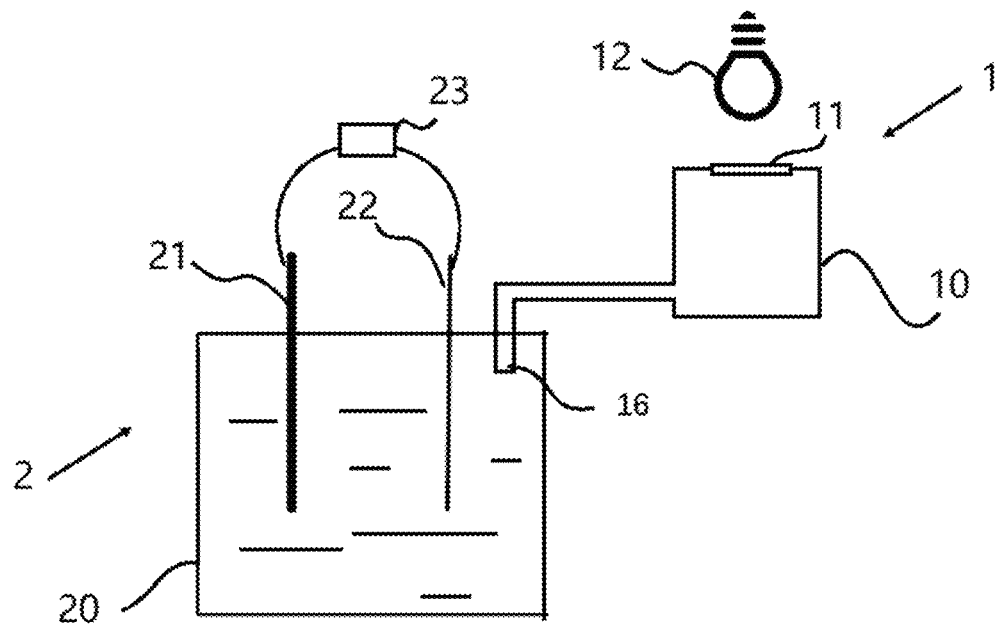
FIG. 16 shows the schematic diagram of an electrolysis system of yet another example.

FIG. 16 shows a schematic diagram of yet another electrolysis system. The electrolysis system can be used to implement the method for preparing a graphene oxide or the method for preparing a halogenated graphene of the present disclosure. The electrolysis system comprises a light treatment device 1 and an electrolysis device 2. The light treatment device 1 comprises a light treatment vessel 10 and a light source 12, the light treatment vessel 10 is used for accommodating an electrolyte solution, and the light source 12 can illuminate the interior of the light treatment vessel 10, thereby illuminating the electrolyte solution contained therein. In this embodiment, a light-transmitting structure 11 is provided on the light treatment vessel, and the light source 12 can illuminate the interior of the light treatment vessel through the light-transmitting structure. The electrolysis device 2 comprises a power source 23, a working electrode 21, a counter electrode 22 and an electrolysis vessel 20, and the electrolysis vessel 20 provides a place where an electrolysis reaction occurs. The power source 23 is electrically connected to the working electrode 21 and the counter electrode 22, respectively. The light treatment vessel 10 has a liquid outlet 16 extending into the electrolysis vessel 20. The light treatment vessel 10 can supply the electrolysis vessel 20 with an electrolyte solution subjected to light treatment.

Figure 17:
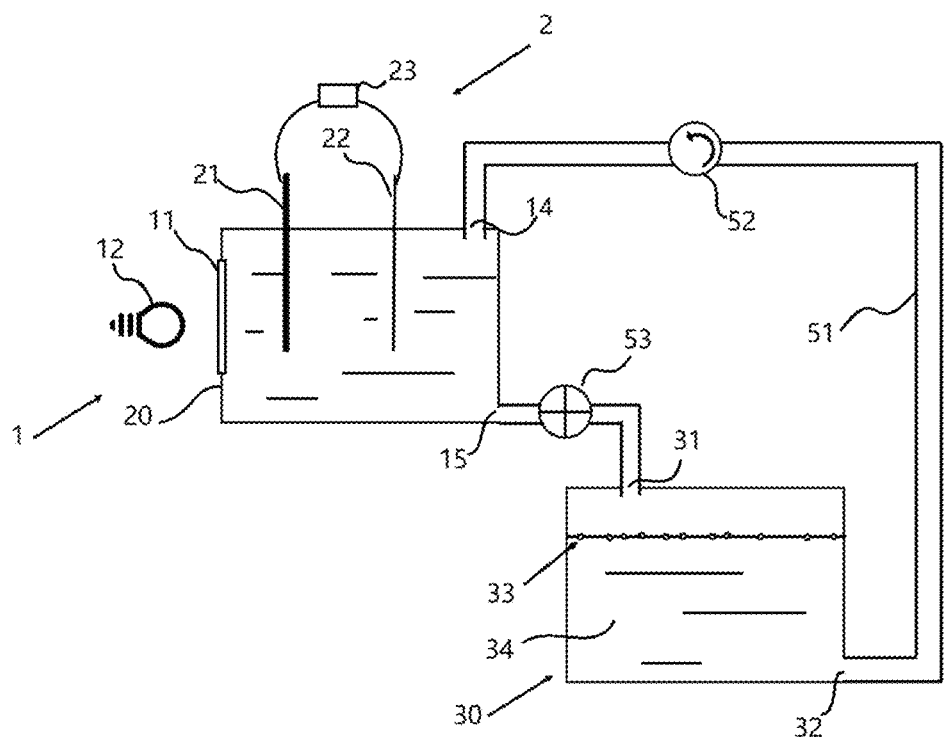
FIG. 17 shows the schematic diagram of an electrolysis system of yet another example.

FIG. 17 shows a schematic diagram of yet another electrolysis system. The electrolysis system can be used to implement the method for preparing a graphene oxide or the method for preparing a halogenated graphene of the present disclosure. The electrolysis system comprises a light treatment device 1 and an electrolysis device 2. The light treatment device 1 has a light source 12. The electrolysis device 2 comprises a power source 23, a working electrode 21, a counter electrode 22 and an electrolysis vessel 20. The electrolysis vessel 20 is used to contain the electrolyte solution and provide a place where the electrolysis reaction occurs. The power source 23 is electrically connected to the working electrode 21 and the counter electrode 22, respectively. In this embodiment, the electrolysis vessel 20 is provided with a light-transmitting structure 11, and the light source 12 can illuminate the interior of the electrolysis vessel 20 through the light-transmitting structure 11, thereby performing light treatment on the electrolyte solution inside the electrolysis vessel 20. The electrolysis system also comprises a circulation loop 51. The electrolysis container 20 is provided with a first liquid inlet 14 and a first liquid outlet 15. The circulation loop 51 is in liquid communication with the first liquid inlet 14 and the first liquid outlet 15 respectively. The circulation loop 51 is provided with a pump 52 and a valve 53. A solid-liquid separating device 30 is connected in series with the circulation loop 51. Based on this, the electrolyte solution in the electrolysis vessel enters the circulation loop 51 for circulation. During the circulation process, the electrolyte solution is subjected to solid-liquid separation treatment when passing through the solid-liquid separating device 30, the solid is collected by the solid-liquid separating device 30, and the liquid continues to circulate back to the electrolysis solution. The electrolysis system can efficiently collect products exfoliated from the working electrode during electrolysis, such as graphene oxide materials or a halogenated graphene materials.

In some embodiments, as shown in FIG. 17, the solid-liquid separating device has a second liquid inlet 31 and a second liquid outlet 32, and the second liquid inlet 31 and the second liquid outlet 32 are in liquid communication with the circulation loop 51. The solid-liquid separating device 30 also comprises a filter membrane 33, the filter membrane 33 is configured to filter the electrolyte solution passing through the solid-liquid separating device. The filter membrane 33 is located between the second liquid inlet 31 and the second liquid outlet 32.

In some embodiments, as shown in FIG. 17, the solid-liquid separating device 30 is provided with a liquid storage tank 34, and the liquid storage tank 34 is located below the filter membrane 33. The second liquid inlet 31 is located above the filter membrane 33, and the second liquid outlet 32 is located below the filter membrane 33. Based on this, the electrolyte solution can enter the liquid storage tank 34 through the filter membrane 33 under the action of gravity to realize the filtration of the electrolyte solution.

Figure 18:
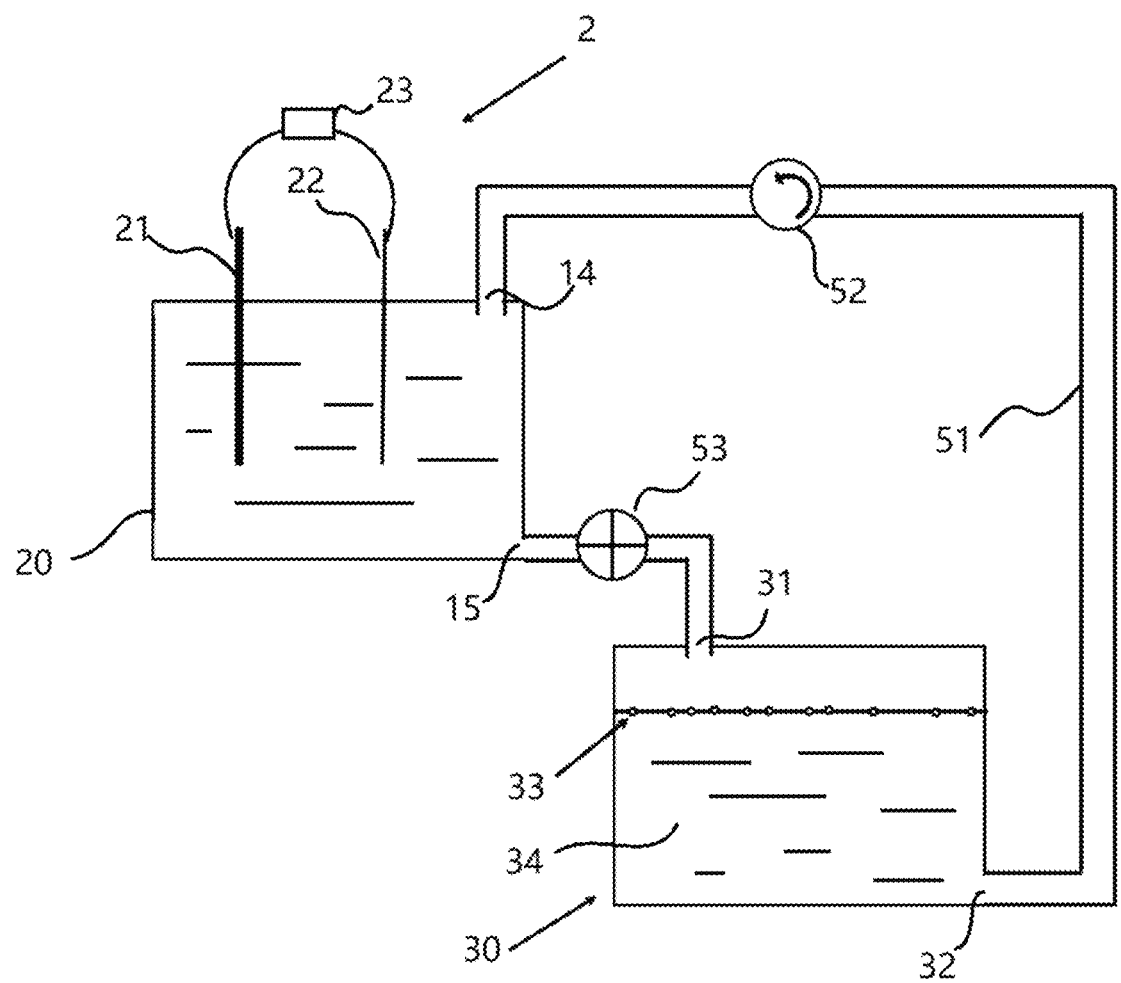
FIG. 18 shows the schematic diagram of an electrolysis system of yet another example.

FIG. 18 is a schematic diagram of an electrolysis system of yet another embodiment. The electrolysis system comprises an electrolysis device 2, and the electrolysis device 2 comprises a power source 23, a working electrode 21, a counter electrode 22 and an electrolysis vessel 20. The electrolysis vessel 20 is used to contain the electrolyte solution and provide a place where the electrolysis reaction occurs. The electrolysis system further comprises a circulation loop 51, and the circulation loop 51 is connected with a solid-liquid separating device 30 in series. Based on this, the electrolyte solution in the electrolysis vessel enters the circulation loop 51 for circulation. During the circulation process, the electrolyte solution is subjected to solid-liquid separation treatment when passing through the solid-liquid separating device 30, the solid is collected by the solid-liquid separating device 30, and the liquid continues to circulate back to the electrolyte solution. Based on this, the products exfoliated from the working electrode during the electrolysis process, such as graphene oxide materials or a halogenated graphene materials, can be efficiently collected.

In some embodiments, as shown in FIG. 18, the electrolysis vessel 20 is provided with a first liquid inlet 14 and a first liquid outlet 15, and the circulation loop 51 is in liquid communication to the first liquid inlet 14 and the first liquid outlet 15 respectively. The circulation loop 51 is provided with a pump 52 and a valve 53. The solid-liquid separating device has a second liquid inlet 31 and a second liquid outlet 32, the solid-liquid separating device further comprises a filter membrane 33, and the filter membrane 33 is located between the second liquid inlet 31 and the second liquid outlet 32.

In some embodiments, as shown in FIG. 18, the solid-liquid separating device 30 is provided with a liquid storage tank 34, and the liquid storage tank 34 is located below the filter membrane 33. The second liquid inlet 31 is located above the filter membrane 33, and the second liquid outlet 32 is located below the filter membrane 33. Based on this, the electrolyte solution can enter the liquid storage tank 34 through the filter membrane 33 under the action of gravity to realize the filtration of the electrolyte solution.

Although specific embodiments of this invention have been described in detail, those skilled in the art will understand that in light of all the teachings disclosed, various changes in detail can be made and are within the scope of this invention. The full scope of the present invention is given by the appended claims and any equivalents thereof.

What is claimed is:

1. A method for preparing a halogenated graphene material in an electrolysis system,
wherein, said electrolysis system comprises:
a working electrode, said working electrode comprises graphite and/or amorphous carbon;
a counter electrode, said counter electrode is an electrical conductor; and
an electrolyte solution, said electrolyte solution is a conductive solution comprising a halide ion and/or a halogen-containing complex ion;
wherein, said method comprises the following steps:
applying a voltage between the working electrode and the counter electrode, so that the graphite and/or amorphous carbon is exfoliated under the action of electrolysis to generate a halogenated graphene;
wherein, before and/or during applying the voltage, applying a light illumination to the electrolysis system;
wherein said light illumination reaches an intensity as follows: said light illumination is capable of reducing the absorbance value at 650 nm of a chromogenic solution with a volume equal to that of the electrolyte solution by 10% or more within 30 minutes, the chromogenic solution is an aqueous solution containing methylene blue and oxalic acid, with a methylene blue concentration of $10^{-6}$ M, and an oxalic acid concentration of 0.1 M;
wherein said light illumination applies light having a wavelength of a nm, a=200~2500,
wherein said light illumination uses a light source which is a xenon lamp, and
wherein said electrolyte solution comprises NaX, wherein X represents F, Cl, Br, or I.

2. The method according to claim 1, characterized by one or more of the following:
said light illumination applies light having an optical power density greater than or equal to 100 mW/cm$^2$;
said light illumination applies light having a power of 10~100W to per liter of said electrolyte solution;
said light illumination has a duration time of 30 minutes or more; and
the working electrode and/or the electrolyte solution are subjected to the light illumination before and/or during applying the voltage.

3. The method according to claim 1, characterized by one or more of the following:
said light illumination reaches an intensity as follows: said light illumination is capable of reducing the absorbance value at 650 nm of a chromogenic solution with a volume equal to that of the electrolyte solution by 20% or more within 30 minutes; and
said light illumination applies light having a wavelength of a nm, a=200~400.

4. The method according to claim 1, characterized by one or more of the following;
said voltage has a value of 2~1000 V;
said voltage is applied for a total time of 5 minutes or more; and
a square wave voltage of −0.5V to 10V is firstly applied between the working electrode and the counter electrode for 10~60 minutes, and then a constant voltage of 10~1000V is applied for 5 minutes or more.

5. The method according to claim 1, characterized by one or more of the following:
said graphite is one or more selected from the group consisting of highly orientated pyrolytic graphite (HOPG), graphite foil, graphite rod, and graphite flake; and
said amorphous carbon is one or more selected from the group consisting of charcoal, coal, coke, and carbon black.

6. The method according to claim 1, wherein said electrolyte solution has a concentration of halogen ions and/or halogen-containing complex ions of 0.001~10 mol/L.

7. A method for preparing a graphene oxide material in an electrolysis system,
wherein, said electrolysis system comprises:
a working electrode, said working electrode comprises graphite and/or amorphous carbon;
a counter electrode, said counter electrode is an electrical conductor; and
an electrolyte solution, said electrolyte solution is a conductive solution comprising a carboxyl group;
wherein, said method comprises the following steps:
applying a voltage between the working electrode and the counter electrode, so that the graphite and/or amorphous carbon are exfoliated under the action of electrolysis to generate a graphene oxide material;
wherein, before and/or during applying the voltage, applying a light illumination to the electrolysis system;
wherein said light illumination reaches an intensity as follows: said light illumination is capable of reducing the absorbance value at 650 nm of a chromogenic solution with a volume equal to that of the electrolyte solution by 10% or more within 30 minutes, the chromogenic solution is an aqueous solution containing methylene blue and oxalic acid, with a methylene blue concentration of $10^{-6}$ M, and an oxalic acid concentration of 0.1 M;
wherein said light illumination applies light having a wavelength of a nm, a=200~2500,
wherein said light illumination uses a light source which is a xenon lamp, and
wherein said electrolyte solution comprises one or more of carboxylic acid and carboxylate salt.

8. The method according to claim 7, characterized by one or more of the following:
said light illumination applies light having an optical power density greater than or equal to 100 mW/cm$^2$;
said light illumination applies light having a power of 10~100W to per liter of said electrolyte solution;
said light illumination has a duration time of 30 minutes or more; and
the working electrode and/or the electrolyte solution are subjected to the light illumination before and/or during applying the voltage.

9. The method according to claim 7, characterized by one or more of the following:
said light illumination reaches an intensity as follows: said light illumination is capable of reducing the absorbance value at 650 nm of a chromogenic solution with a volume equal to that of the electrolyte solution by 20% or more within 30 minutes; and
said light illumination applies light having a wavelength of a nm, a=200~400.

10. The method according to claim 7, characterized by one or more of the following;
said voltage has a value of 2~1000 V;
said voltage is applied for a total time of 5 minutes or more; and
a square wave voltage of −0.5V to 10V is firstly applied between the working electrode and the counter electrode for 10~60 minutes, and then a constant voltage of 10~1000V is applied for 5 minutes or more.

11. The method according to claim 7, characterized by one or more of the following:
said graphite is one or more selected from the group consisting of highly orientated pyrolytic graphite (HOPG), graphite foil, graphite rod, and graphite flake; and
said amorphous carbon is one or more selected from the group consisting of charcoal, coal, coke, and carbon black.

12. The method according to claim 7, characterized by one or more of the following:
said electrolyte solution comprises one or more of the following substances: oxalic acid and oxalate salt;
said electrolyte solution further comprises a hydroxyl group;
said the electrolyte solution has a carboxyl group concentration of 0.001~10 mol/L; and
said electrolyte solution has a pH of 0~12.

13. The method according to claim 12, characterized by one or more of the following:
the carboxylic acid is one or more selected from the group consisting of formic acid, oxalic acid, tricarballylic acid, and butanetetracarboxylic acid; and
the carboxylate salt is one or more selected from the group consisting of formate salt, oxalate salt, tricarballylate salt, and succinate salt.

14. The method according to claim 13, characterized by one or more of the following:
said electrolyte solution comprises Na$^+$;
said electrolyte solution comprises SO$_4^{2-}$;
said electrolyte solution comprises Na$_2$SO$_4$; and
said electrolyte solution has a SO$_4^{2-}$ concentration of 0.001~10 mol/L.

15. The method according to claim 7, wherein the graphene oxide material has an XPS spectrum with the following characteristics: the XPS spectrum has a C1s peak, when subjected to a peak-split process, generating a peak corresponding to 287.8~288.3 eV and a peak corresponding to 286.0~286.5 eV having a ratio 0.3~2:1.

16. The method according to claim 7, wherein the graphene oxide material has a XPS spectrum with the following characteristics: the XPS spectrum has a C1s peak and a O1s peak with an area ratio of 0.8~2.2:1.

* * * * *